United States Patent
Lambeth et al.

(10) Patent No.: US 10,668,340 B2
(45) Date of Patent: Jun. 2, 2020

(54) PUTTER-TYPE GOLF CLUB HEAD

(71) Applicant: DUNLOP SPORTS CO. LTD., Kobe-shi, Hyogo (JP)

(72) Inventors: Jacob Lambeth, Irvine, CA (US); Mika Becktor, New York, NY (US)

(73) Assignee: SUMITOMO RUBBER INDUSTRIES, LTD., Kobe (JP)

( * ) Notice: Subject to any disclaimer, the term of this patent is extended or adjusted under 35 U.S.C. 154(b) by 0 days.

(21) Appl. No.: 15/946,961

(22) Filed: Apr. 6, 2018

(65) Prior Publication Data

US 2018/0311545 A1 Nov. 1, 2018

Related U.S. Application Data

(60) Provisional application No. 62/491,654, filed on Apr. 28, 2017.

(51) Int. Cl.
  A63B 53/04 (2015.01)
  B23P 15/00 (2006.01)
  B23C 3/34 (2006.01)

(52) U.S. Cl.
  CPC .......... *A63B 53/0487* (2013.01); *A63B 53/04* (2013.01); *B23C 3/34* (2013.01); *B23P 15/00* (2013.01); *A63B 2053/0408* (2013.01); *A63B 2053/0416* (2013.01); *A63B 2053/0445* (2013.01); *A63B 2053/0458* (2013.01)

(58) Field of Classification Search
  CPC .... A63B 2053/0445; A63B 2053/0416; A63B 53/0487; A63B 53/04
  USPC ......................................... 473/330, 331, 342
  See application file for complete search history.

(56) References Cited

U.S. PATENT DOCUMENTS

| | | | |
|---|---|---|---|
| 9,452,326 B2 | 9/2016 | Serrano et al. | |
| 9,943,735 B2 | 4/2018 | Rife | |
| 10,343,034 B2 | 7/2019 | Henrikson et al. | |
| 2009/0221384 A1 | 9/2009 | Kato et al. | |
| 2013/0085011 A1* | 4/2013 | Serrano | A63B 53/0487 473/331 |
| 2014/0274452 A1 | 9/2014 | Oldknow | |
| 2015/0367197 A1* | 12/2015 | Ripp | A63B 53/047 473/331 |
| 2016/0059089 A1* | 3/2016 | Jertson | A63B 53/047 473/290 |
| 2016/0375325 A1 | 12/2016 | Serrano et al. | |
| 2017/0072274 A1 | 3/2017 | Jertson et al. | |
| 2017/0239534 A1 | 8/2017 | Rife | |

OTHER PUBLICATIONS

Noyce, "Evnroll Putter Has Sweetest Face in Golf", Mar. 9, 2016, http://www.golfalot.com/equipment-news/evnroll-putters-have-sweetest-face-in-golf-3520.aspx.
Dusek, "Ping Sigma G Putters", Jan. 30, 2017, https://golfweek.com/2017/01/30/ping-sigma-g-putters/.
Jul. 17, 2019 Office Action issued in U.S. Appl. No. 16/112,192.

* cited by examiner

*Primary Examiner* — Benjamin Layno
(74) *Attorney, Agent, or Firm* — Oliff PLC

(57) ABSTRACT

A putter-type golf club head includes a striking face with a plurality of grooves having a variable depth profile and a variable pitch. Groove variation is tailored to correspond to the golf club heads' moment-of-inertia, mass, or another attribute. A surface treatment method includes selecting a variable depth profile and a variable pitch for a plurality of grooves and surface milling a striking face of a golf club head to form the plurality of grooves.

13 Claims, 19 Drawing Sheets

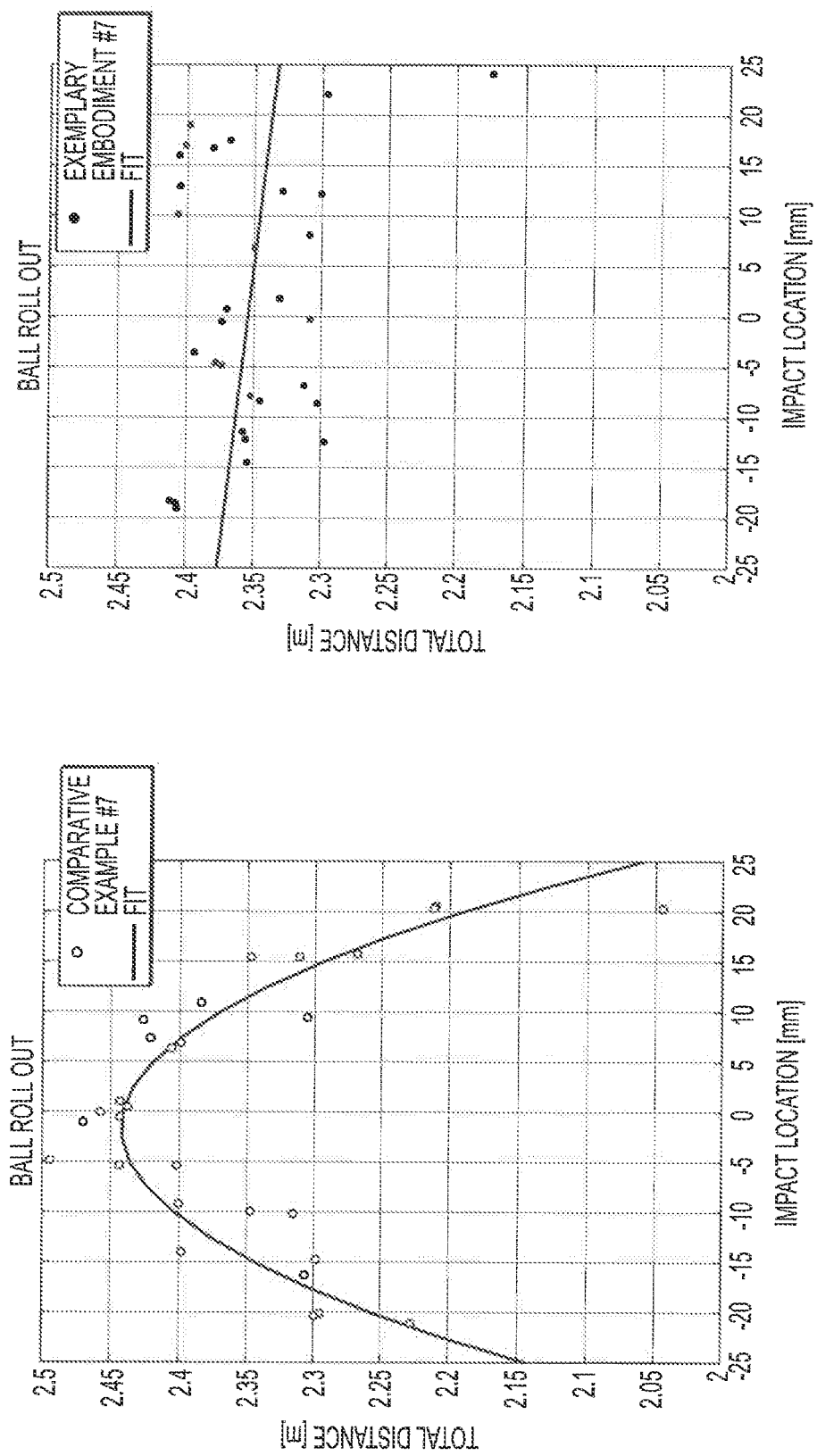

PUTTER-TYPE GOLF CLUB HEAD

CROSS REFERENCE TO RELATED APPLICATION

This application claims the benefit under 35 U.S.C. § 119(e) of U.S. Provisional Patent Application Ser. No. 62/491,654 filed on Apr. 28, 2017, the subject matter of which is incorporated herein by reference in its entirety.

BACKGROUND

Putter-type golf club heads with some degree of groove variation, e.g., depth, pitch, and width, are known. Varying groove parameters is known to affect the degree of energy transfer from the club head to the golf ball at impact. However, known groove variations are insufficient to appropriately counterbalance the putter heads in which they are embodied. This could be for several reasons. Manufacturers of known putter-type club heads may be reliant on an inefficient manufacturing process, in which a single rotating bit mills each groove to a variable profile This necessitates increases in processing time and expense, which are likely cost-prohibitive for mainstream markets. Manufacturers may also fail to realize that variations in groove profile are tailorable to a particular club head. Finally, they may fail to realize the full scope of groove parameters that may be relevant to energy transfer at impact.

SUMMARY

The present inventors identified, however, that groove depth and pitch, for example, significantly affect shot distance, and they therefore could be used to counteract the natural speed drop-off for impacts away from the center of the club face. By creating a face pattern with variable milling depth (measured perpendicular to the face plane) and pitch (the interval spacing between the mill grooves), the inventors sought to achieve consistent shot distance regardless of where an impact occurs on the striking face. The end result is a relatively wide region of the striking face that has a relatively consistent rebound speed based on a constant impact velocity. Shot dispersion is thus minimized, resulting in greater overall performance.

The present inventors also appreciated the relationship between moment-of-inertia ("MOI") and depth variation. In general, increasing MOI has been observed to reduce speed dropoff, so the less dramatic groove variation that is required. This understanding is incorporated into the club heads and methods of surface treating the club heads described below.

In one or more aspects of the disclosure, a surface treatment method includes surface milling a striking face of the golf club head using a cutter, thereby forming a plurality of grooves on the striking face. The plurality of grooves includes a variable depth profile such that groove depth generally decreases in a laterally outward direction of the striking face's face center. The surface milling may occur at a rotational speed and a feed rate such that the groove pitch generally increases in a laterally outward direction of the face center.

In one or more aspects of the disclosure, a surface treatment method includes providing a golf club head having a striking face, a heel, a toe, and a key physical attribute and forming a plurality of grooves in the striking face. Forming the plurality of grooves includes selecting a depth profile for the plurality of grooves along a heel-to-toe direction of the striking face based, at least in part, on the key physical attribute.

In one or more aspects of the disclosure, a surface treatment method includes providing a golf club head having a striking face, a heel, a toe, and a predetermined MOI value and forming a plurality of grooves in the striking face. Forming the plurality of grooves includes selecting a depth profile for the plurality of grooves along a heel-to-toe direction of the striking face based, at least in part, on the predetermined MOI value.

In one or more aspects of the disclosure, a surface treatment method includes providing a golf club head having a striking face, a heel, a toe, and a predetermined mass and forming a plurality of grooves in the striking face. Forming the plurality of grooves includes selecting a depth profile for the plurality of grooves along a heel-to-toe direction of the striking face based, at least in part, on the predetermined mass.

In one or more aspects of the disclosure, a golf club head that, when oriented in a reference position, includes a top portion, a bottom portion opposite the top portion, a heel portion, a toe portion opposite the heel portion, and a striking face. The striking face includes a face center and a plurality of grooves. Each of the plurality of grooves may have a substantially constant depth along the particular groove while the plurality of grooves has a variable depth as measured in a heel-to-toe direction.

The various exemplary aspects described above may be implemented individually or in various combinations. These and other features and advantages of a golf club head and method of surface treating a golf club head according to the invention in its various aspects and demonstrated by one or more of the various examples will become apparent after consideration of the ensuing description, the accompanying drawings, and the appended claims.

BRIEF DESCRIPTION OF THE DRAWINGS

The present disclosure is described with reference to the accompanying drawings, in which the reference characters reference like elements, and wherein:

FIG. 14A is a plot including outlier points correlating ball roll out distance with impact location for the seventh comparative golf club;

FIG. 14B is a plot including outlier points correlating ball roll out distance with impact location for the seventh exemplary embodiment;

DETAILED DESCRIPTION

Representative examples of one or more novel and non-obvious aspects and features of a golf club head and method of surface treating a golf club head according to the present disclosure are not intended to be limiting in any manner. Furthermore, the various aspects and features of the present disclosure may be used alone or in a variety of novel and non-obvious combinations and sub-combinations with one another.

Figure 1:
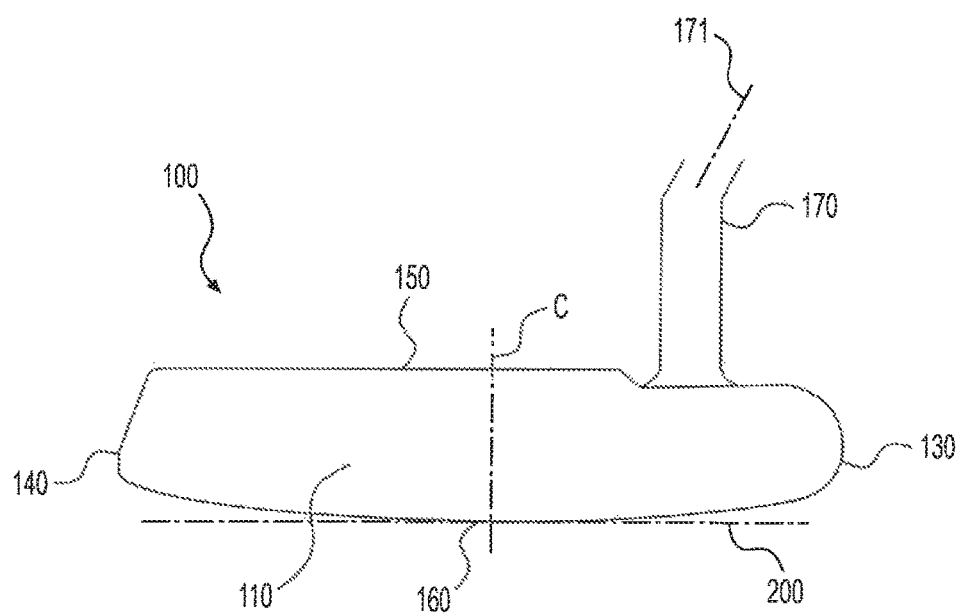
FIG. 1 is a front elevation view of a golf club head in accordance with an embodiment of the present disclosure.
Figure 2:
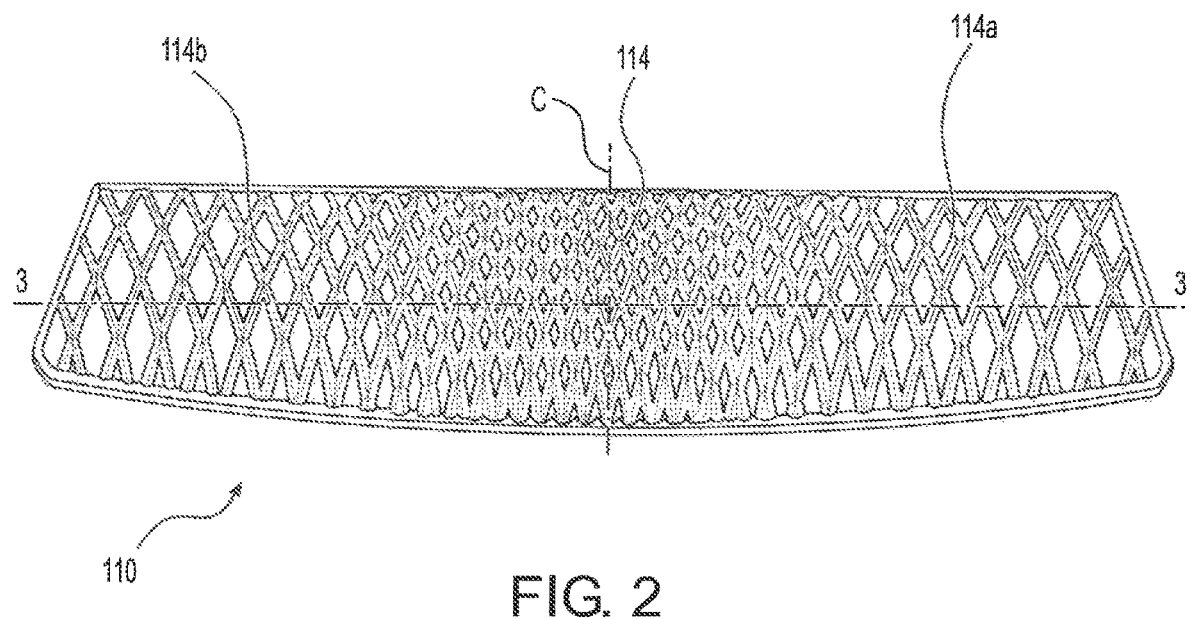
FIG. 2 is a front elevation view of a striking face of the golf club head of FIG. 1.
Figure 3:
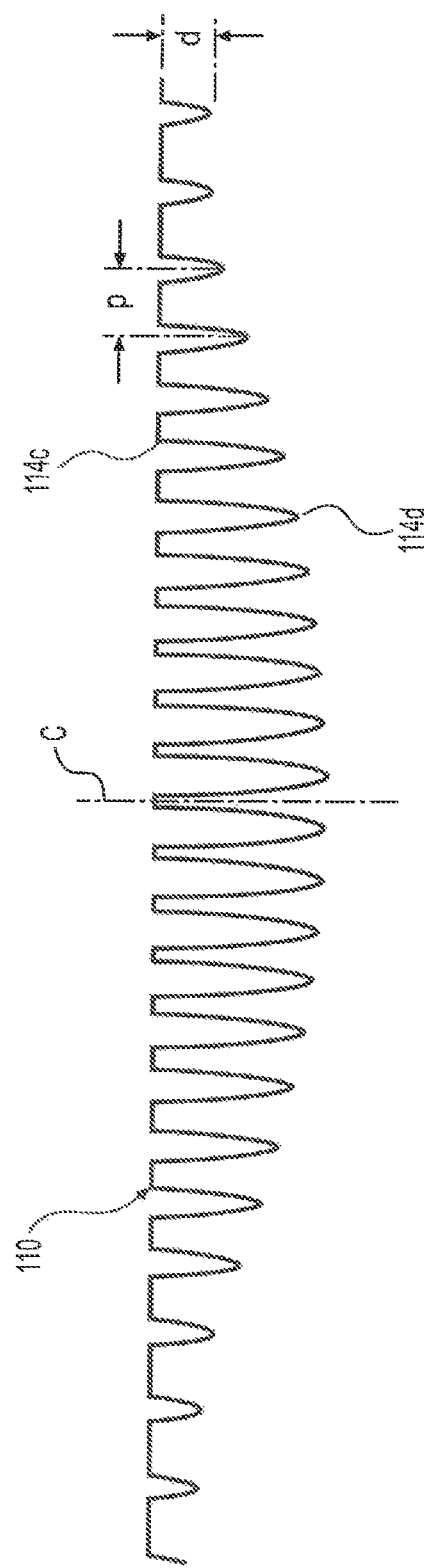
FIG. 3 is a partial cross-sectional view taken along line 3-3 of FIG. 2.

Referring to FIGS. 1-3, a putter-type golf club head 100 includes a striking face 110, a heel portion 130, a toe portion 140 opposite the heel portion 130, a top portion 150, a bottom portion 160 opposite the top portion 150, and a hosel 170. The hosel 170 preferably comprises a bore configured to securably receive a conventional golf shaft. In some embodiments, the hosel 170 extends outward from the top portion 150 and may optionally contain a bend or curve (e.g. "plumber's neck" type). In other embodiments, a bore may be provided directly in the top portion 150 and extending sole-ward for accommodating a conventional golf shaft. In yet other embodiments, the hosel 171 may comprise a male-type hosel constituting a boss extending upward from the top portion 150 and configured to be insertable within a conventional golf shaft. The hosel 171 includes a central longitudinal hosel axis 171 corresponding to a central longitudinal axis defined by an internal bore or outward protrusion or boss (in the case of a male-type hosel 171).

The striking face 110 includes a center line C. The center line C, for all purposes herein, denotes a line substantially parallel to the striking face and disposed on an imaginary vertical plane coincident with a center of gravity of the golf club head and substantially perpendicular to the striking face 110. The center line C passes through a so-called "sweet spot" of the golf club head 100 and may, in some embodiments, also pass through a face center FC of the golf club head 100.

The golf club head 100 is shown in a reference position in FIG. 1. "Reference position," as used herein, refers to an orientation of a club head (e.g. golf club head 100) relative to a virtual ground plane 200 in which a bottom portion 160 of the club head contacts the ground plane 200 and the center hosel axis 171 of the hosel 170 is in a hosel vertical plane, which is perpendicular to the ground plane 200 and also perpendicular to the imaginary vertical plane coincident with the center of gravity of the golf club head referenced above.

As shown in FIG. 2, the striking face 110 includes a plurality of grooves 114 on a generally planar surface. The plurality of grooves 114 may include a first plurality of grooves 114a and a second plurality of grooves 114b. Each of the first plurality of grooves 114a may be substantially parallel to each other. Similarly, each of the second plurality of grooves 114b may be substantially parallel to each other. Each of the plurality of grooves 114 may be generally arcuate in shape and extend from the top of the striking face 110 to the bottom of the striking face. Each of the plurality of arcuate grooves 114 may have a substantially constant radius of curvature, both along such groove and, optionally, from groove to groove within the plurality of grooves. In some embodiments, the first plurality of grooves shares a substantially equal radius of curvature with the second plurality of grooves. A pattern formed by the second plurality of grooves 114b may be an inversion about the center line C of a pattern formed by the first plurality of grooves 114a. Additionally, the first plurality of grooves 114a may at least in part intersect the second plurality of grooves 114b.

The striking face 110 of FIG. 2 may be a part of a striking face insert formed separately from a main body of the golf club head 100 and joined to the main body, e.g. by mechanical fasteners, interference fit, or chemical adhesive. Alternatively, the striking face 110 may be formed integrally with the golf club head as a unitary body.

In one or more aspects of the present disclosure, the groove depth d of a particular groove among the plurality of grooves 114 may be substantially constant. For example, in such aspects, depth variation along any particular groove among the plurality of grooves 114 is no more than a few micrometers. More particularly, the depth variation along a particular groove may be less than or equal to 10 μm. More preferably, the depth variation along a particular groove may be no greater than 5 μm.

Thus, depth variation may be achieved stepwise from groove to groove such as in FIG. 3, which shows a partial cross-sectional view of the striking face 110 taken in plane 3-3' as shown in FIG. 2. For illustrative purposes, the view of FIG. 3 may not be shown to scale. The plurality of grooves 114 includes a variable depth profile, which includes a groove depth d for each of the plurality of grooves 114. The depth d may vary from groove to groove. The groove depth d of a particular groove closer to the heel portion 130 may be smaller in magnitude than the groove depth d of another groove closer to the center line C. Additionally, or alternatively, the groove depth d of a particular groove closer to the toe portion 140 may be smaller in magnitude than the groove depth of another groove closer to the center line C.

As illustrated in FIG. 3, each groove of the plurality of grooves 114 includes opposing side walls 114c and a groove bottom 114d. The side walls 114c may transition inwardly and rearwardly (in a direction opposite the face) to the groove bottom 114d.

In one or more aspects of the present disclosure, the groove depth d generally decreases in an outward direction from the face center FC of the striking face 110. For example, the groove depth d may vary such that the depth d is approximately provided by the following depth equation:

$$a_d x^2 + b_d x + c_d,$$

where:
$a_d$, $b_d$, and $c_d$ are each a constant value; and
x is a lateral position on a club face relative to the center line C, positive representing toe-ward of the center line C.

Herein, x may correspond to a lateral position of a particular groove from among the plurality of grooves 114 at a fixed vertical distance about the ground plane 200 where the lateral dimension refers to a heel-to-toe direction along the striking face 110. The groove depth d may be varied such that $a_d$ is about 0.0006 mm$^{-1}$, $b_d$ is about 0, and $c_d$ is about −0.4 mm.

The plurality of grooves 114 also includes a groove pitch p. Herein, the groove pitch p is defined by groove-to-groove spacing along the striking face. As shown in FIGS. 2 and 3, the groove pitch p may vary in a heel-to-toe direction of the striking face. For example, the groove pitch p may be larger near the heel portion 130 than near the center line C. Additionally, or alternatively, the groove pitch p may be larger near the toe portion 140 than near the center line C.

In one or more aspects of the present disclosure, the groove pitch p generally increases in a laterally outward direction from the center line C of the striking face 110. For example, the groove pitch p may vary such that the pitch p is approximately provided by the following pitch equation:

$$a_p x^2 + b_p x + c_p,$$

where:
$a_p$, $b_p$, and $c_p$ are each a constant value and
x is a lateral position on a club face relative to the center line C.

Herein, x may correspond to a lateral position of a particular groove from among the plurality of grooves 114 at a fixed vertical distance about the ground plane 200 where the lateral dimension refers to a heel-to-toe direction along the striking face 110. The groove pitch p may be varied such that $a_p$ is about 0.002 mm$^{-1}$, $b_p$ is about 0, and $c_p$ is about 2 mm.

In one or more aspects of the present disclosure, both the groove pitch p and the groove depth d of the plurality of grooves 114 vary. For example, the groove depth of a particular groove may be larger near the center line C than the groove depth of another particular groove proximate the heel and/or toe while the groove pitch p is smaller near the center line C and larger proximate the heel and/or toe. In another example, the groove depth d generally increases and the groove pitch p generally decreases in a laterally outward direction from the face center FC. The groove depth d may vary according to the depth equation above and the groove pitch p may vary according to the pitch equation given above.

As shown in FIGS. 1 and 2, in one or more aspects of the present disclosure, a golf club head 100 is shown as oriented in a reference position. The golf club head 100 includes a striking face 110 having a plurality of raised features formed thereon. The raised features each terminate in a forward surface (i.e. a land area) defining a maximum lateral extent, wherein the maximum lateral extent generally increases laterally outward from the face center FC. Each of the forward surfaces is generally planar. In some aspects, low-scale texture such as a media blast or fine milling may be further applied to the forward surfaces. Additionally, the forward surfaces are substantially coplanar with a striking face plane. Alternatively, or additionally, each of the forward surfaces may have a corresponding area and the corresponding areas of the plurality may generally increase laterally outward from the face center FC.

Also, as shown in FIGS. 1 and 2, according to one or more aspects of the disclosure, each of the plurality of forward surfaces is polygonal. According to one or more aspects of the disclosure, each of the plurality of forward surfaces is substantially rhombic in shape.

Additionally, the striking face 110 having a plurality of raised features formed thereon may include a plurality of grooves and each of the polygonal surfaces may be spaced from an adjacent polygonal surface by one of the plurality of grooves. In one or more aspects, the plurality of grooves may have variable depth profile and the depth of any particular groove may be selected according to the depth equation provided above.

Figure 4:
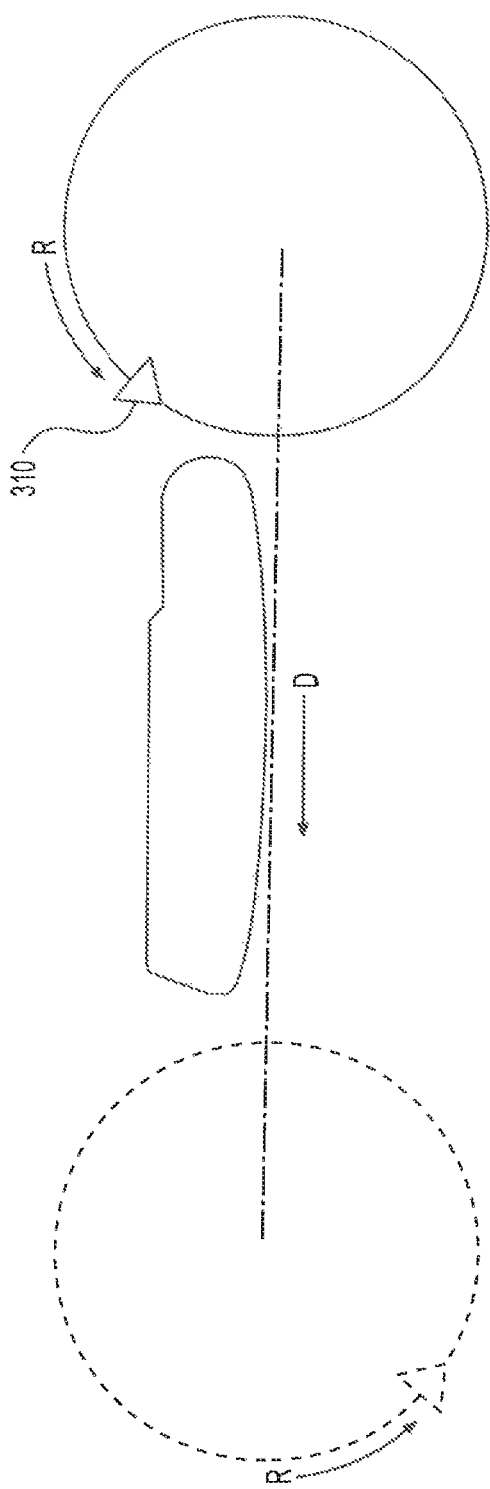
FIG. 4 is a schematic illustration showing a milling tool forming a plurality of grooves.

According to one or more aspects of the disclosure, a plurality of grooves 114 may be formed by surface milling, as illustrated in FIG. 4, using a surface milling tool 300, which includes a cutter 310 rotating at a speed R and being fed at a feed rate F in a direction D. The direction D may be across a striking face 110 of a golf club head and the plurality of grooves 114 may be formed by single pass of the surface milling tool. The feed rate F and the rotational speed R of the cutter 310 may be varied to vary a groove pitch p of the plurality of grooves 114 according to the following equation:

$$p = \frac{F}{R}$$

Alternatively, simply the rotational speed R or the feed rate F may be varied to vary the groove pitch p. The pitch p may generally decreases in a laterally outward direction of the face center FC of the striking face 110. The plurality of grooves 114 formed by surface milling may also include a variable depth profile such that groove depth d generally decreases in a laterally outward direction of the face center of the striking face. Groove depth d may be varied by varying the depth of the cutter during the surface mil ling. Herein, "variably milled grooves" describes a plurality of grooves 114 formed by surface milling having a variable depth profile and/or a variable pitch.

Figure 5A:
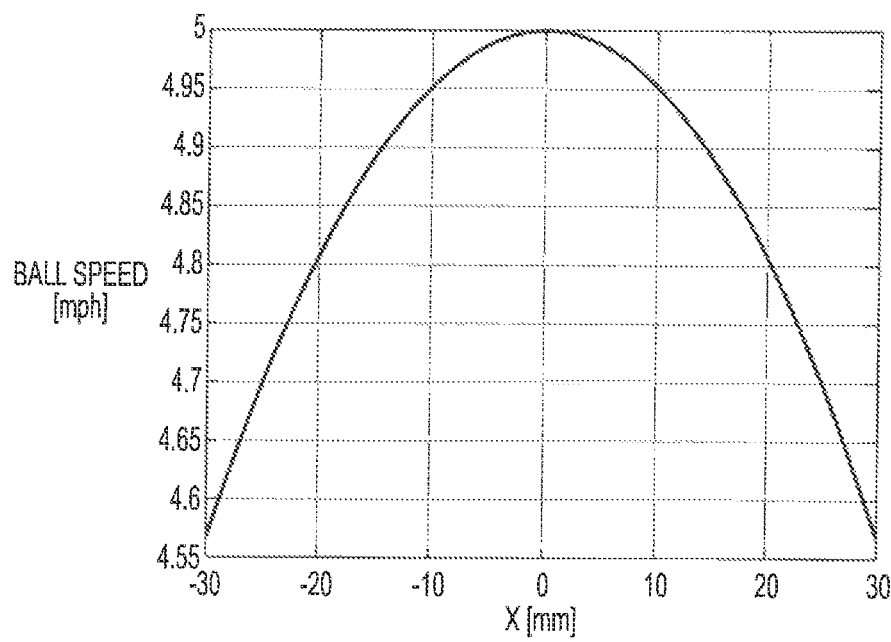
FIG. 5A is plot correlating ball speed with a horizontal distance from a face center.

According to one or more aspects of the disclosure, groove depth d and groove pitch p of a striking face 110 of a golf club head 100 may be varied more specifically based on natural variation of ball speed upon impact with the golf club head 100 at different locations of the striking face 100. FIG. 5A plots theoretical speed of a golf ball upon consistent impact with a golf club head having a striking face without variably milled grooves 114. In the figure, "X" denotes a horizontal distance along the striking face and away from the center line C, whereby the positive direction corresponds with toe-ward. As seen in the graph, the ball speed decreases as the absolute magnitude of "X" increases. The ball speed upon impact may be approximated by a quadratic function to be discussed further below.

Figure 5B:
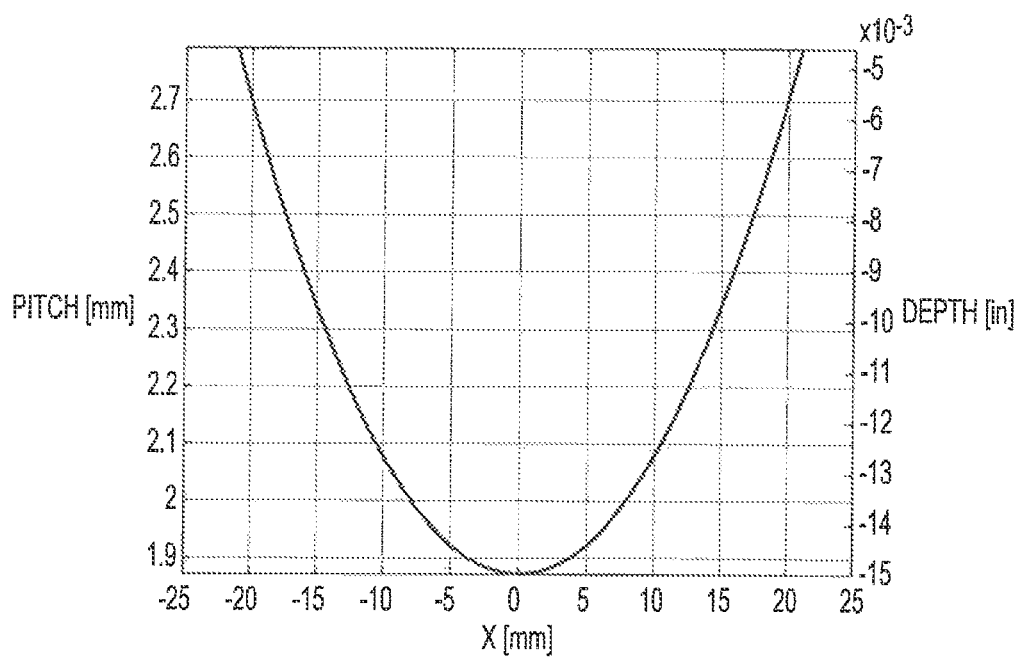
FIG. 5B is a plot showing pitch and depth variation across a striking face.

FIG. 5B plots both theoretical depth d (right axis) and theoretical pitch p across a wide horizontal range of the striking face (e.g., |X|>20 mm), where both depth d and pitch p are varied for purposes of modifying the distribution of, preferably to make more consistent, ball speed away from the center line C. In practice, the depth d and pitch p may be proportionally related as an effect of the groove forming environment; for example, the depth d and pitch p formed by a surface-milling tool as discussed above may vary proportionally with varying cutting depth, feed rate, and rotational speed. The theoretical depth and pitch show in FIG. 5B may be approximated by the quadratic equations described above where $$depth = a_d x^2 + b_d x + c_d$$

and $$pitch = a_p x^2 + b_p x + c_p.$$

Table 1 lists $a_d$, $b_d$, and $c_d$ values of example golf clubs, each having a striking face 110 including a plurality of grooves 114 formed by surface milling. A depth profile of each of the golf clubs is defined by the above depth equation and the corresponding values of $a_d$, $b_d$, and $c_d$. While only $a_d$ is different among the examples shown in Table 1, the disclosure encompasses other values of $a_d$, $b_d$, and $c_d$ suitable for a desired variation in groove depth. Also, depth and/or pitch variation may be expressed in terms of mathematical models other than a quadratic formula, e.g. a continuous or step-wise linear, exponential, or cubic mathematical expression or any combination thereof.

TABLE 1

| Name | $a_d$ (mm$^{-1}$) | $b_d$ | $c_d$ (mm) |
|---|---|---|---|
| Example 1 | 0.000715163 | 0 | −0.381 |
| Example 2 | 0.000651271 | 0 | −0.381 |
| Example 3 | 0.000620863 | 0 | −0.381 |
| Example 4 | 0.000563686 | 0 | −0.381 |
| Example 5 | 0.000536867 | 0 | −0.381 |
| Example 6 | 0.000636284 | 0 | −0.381 |

Table 2 provides values of $a_p$, $b_p$, and $c_p$ corresponding to the example golf clubs of Table 1 where the pitch variation is defined by the above pitch equation. While only $a_p$ is different among the examples shown in Table 2, the disclosure encompasses other values of $a_p$, $b_p$, and $c_p$ suitable for a preferred variation in groove pitch. Also, depth and/or pitch variation may be expressed in terms of mathematical models other than a quadratic formula, e.g. a continuous or step-wise linear, exponential, or cubic mathematical expression or any combination thereof.

TABLE 2

| Name | $a_p$ (mm$^{-1}$) | $b_p$ | $c_p$ (mm) |
|---|---|---|---|
| Example 1 | 0.002355 | 0 | 1.87 |
| Example 2 | 0.002144 | 0 | 1.87 |
| Example 3 | 0.002044 | 0 | 1.87 |
| Example 4 | 0.001856 | 0 | 1.87 |
| Example 5 | 0.001768 | 0 | 1.87 |
| Example 6 | 0.002095 | 0 | 1.87 |

Figure 6:
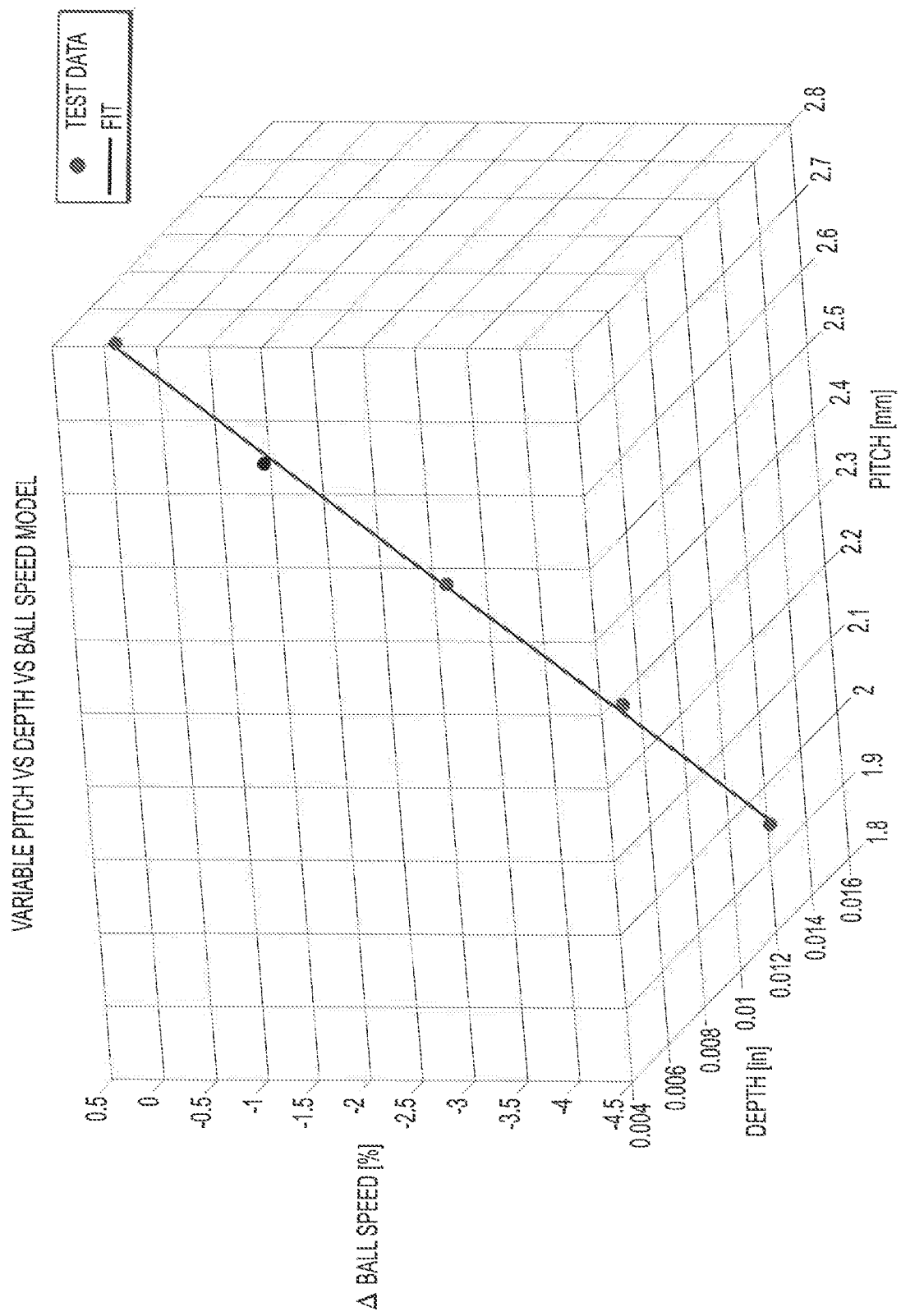
FIG. 6 is a three-dimensional plot showing a relationship between change in ball speed, groove depth, and groove pitch.

The inventors tested the example clubs described in Tables 1 and 2 by first establishing a relationship between ball speed upon impact with groove depth and groove pitch. Statistical analysis of ball speed upon impact at the center line C (i.e., X=0) for each of the example clubs, which include striking faces with different groove depths and pitches, is summarized in Table 3. FIG. 6, which is a three-dimensional plot of the percent difference in ball speed relative to the maximum ball speed of Example 2 against groove depth and pitch, indicates a generally linear relationship between the ball speed upon impact and the groove depth and pitch at the impact location.

TABLE 3

| | Example 1 | Example 2 | Example 3 | Example 4 | Example 5 |
|---|---|---|---|---|---|
| Mean (mph) | 5.59 | 5.62 | 5.57 | 5.51 | 5.45 |
| Median (mph) | 5.58 | 5.61 | 5.57 | 5.50 | 5.44 |
| CI (mph) | 0.029 | 0.017 | 0.021 | 0.027 | 0.029 |
| Upper (mph) | 5.619 | 5.633 | 5.586 | 5.537 | 5.481 |
| Lower (mph) | 5.561 | 5.599 | 5.545 | 5.483 | 5.423 |
| X [mm] | 0 | 0 | 0 | 0 | 0 |
| Loss relative to max (pattern 2) | −0.59% | 0.00% | −0.83% | −2.02% | −3.11% |

Figure 7:
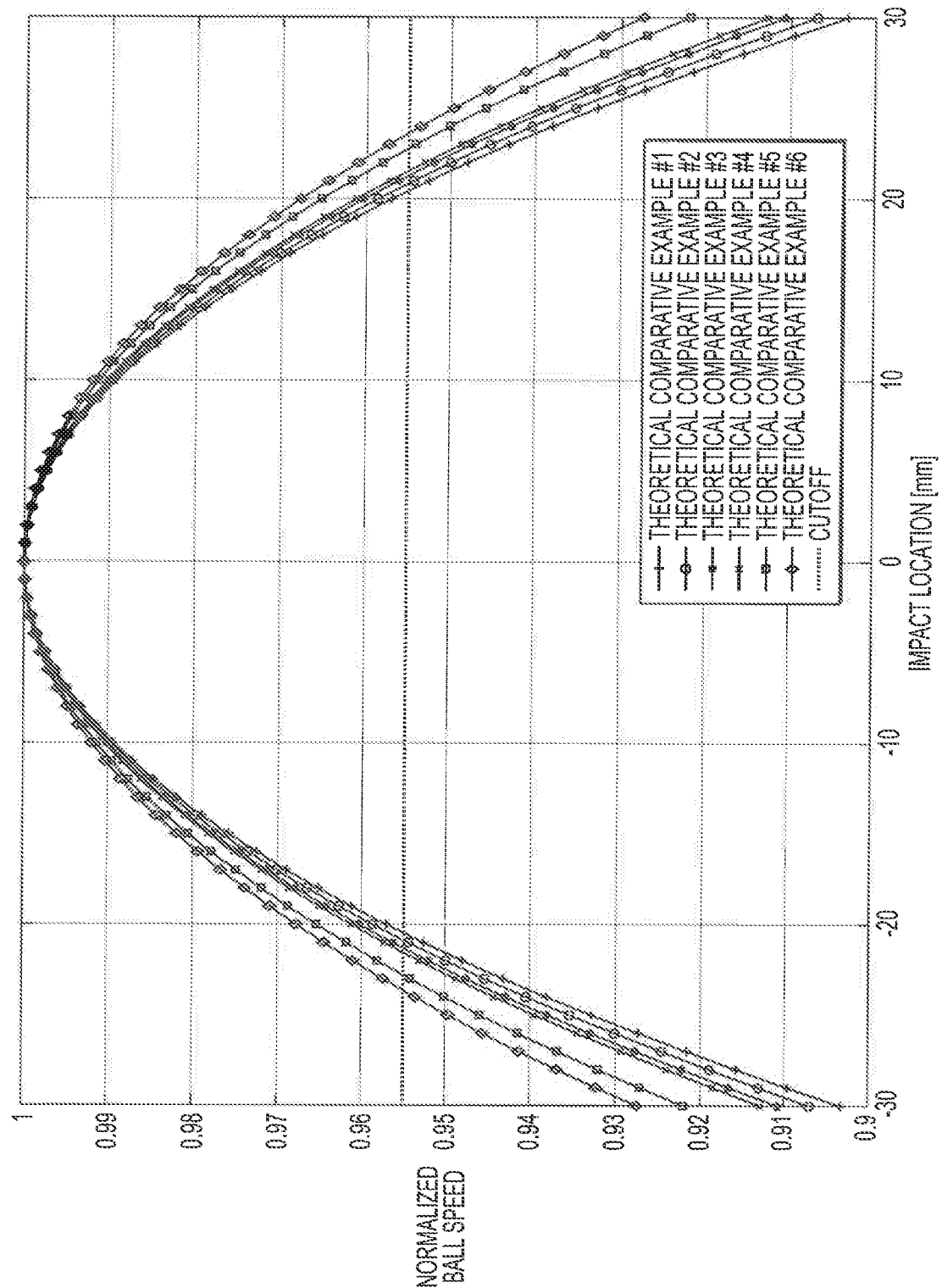
FIG. 7 shows theoretical ball speed plots for six comparative golf club heads having different physical properties and non-variable milling.

FIG. 7 plots computationally-modeled ball speed (normalized to ball speed at impact at the center line C) for six different theoretical golf club heads each having a striking face without variably milled grooves 114. Such a striking face may include a plurality of grooves having uniform depth and pitch in a laterally outward direction of a face center of the striking face (referred to herein as "non-variable milled grooves") or a flat surface without a plurality of grooves. As in the case of the theoretical golf club head of FIG. 5A, the ball speeds for each of the six golf club heads in FIG. 7 decrease in a laterally outward direction of the face center (Impact Location=0).

Figure 8A:
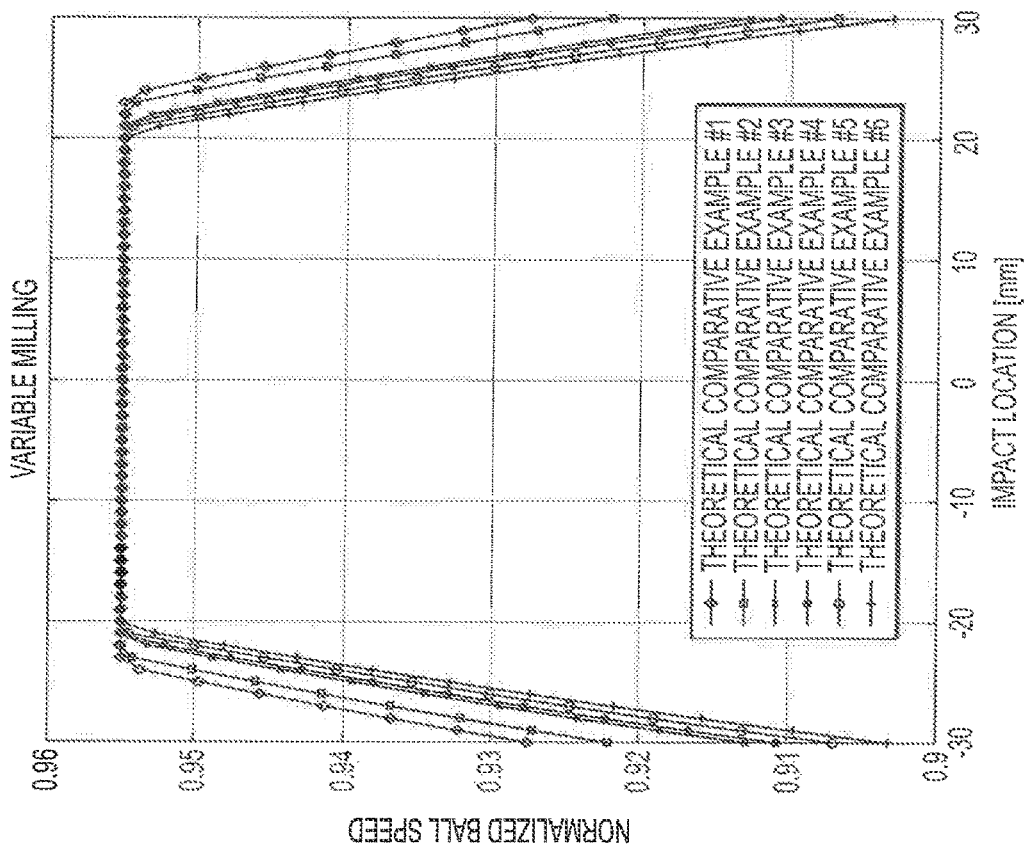
FIG. 8A shows theoretical ball speed plots for six comparative golf club heads having different physical properties and striking faces with non-variable milling.
Figure 8B:
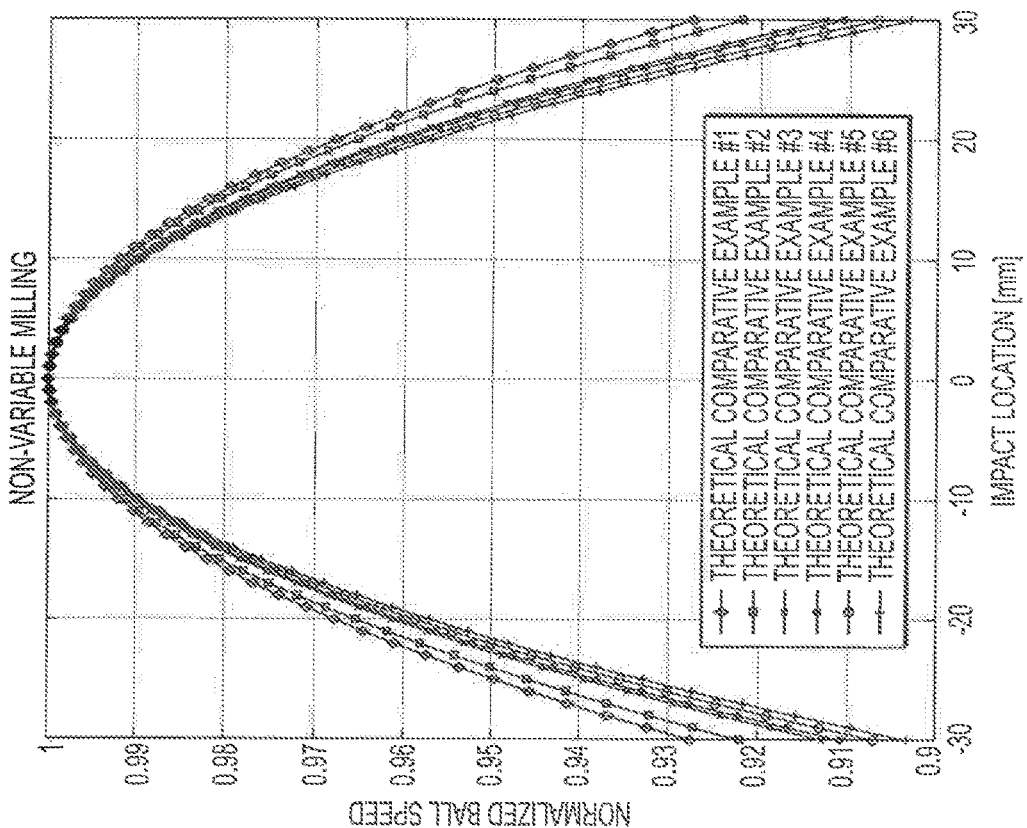
FIG. 8B shows theoretical ball speed plots for six exemplary embodiments of six golf club heads having different physical properties and striking faces with variable depth and pitch grooves.

Similarly, FIG. 8A plots normalized ball speed for six theoretical golf club heads each having a striking face with a plurality of grooves having uniform depth and pitch. Such golf club heads may be manufactured by a deep-milling process disclosed in U.S. application Ser. No. 15/198,867, which is herein incorporated by reference. Each of the theoretical comparative golf club heads shown in FIG. 8A corresponds to a theoretical exemplary golf club head of FIG. 8B, which plots the normalized ball speed for theoretical golf club heads having variably milled grooves 114. The plurality of grooves 114 formed on each of these golf club heads are tailored to match physical properties of that particular golf club head. For example, the plurality of grooves may have a variable pitch and a variable depth profile to correspond to the pitch and depth equations described above where the variables $a_d$, $b_d$, $c_d$, $a_p$, $b_p$, and $c_p$ are varied according to the physical properties of a particular golf club head. Each of the plots of FIG. 8B show a wide region (e.g., |X|>20 mm) of constant ball speed, demonstrating the effectiveness of matching pitch and depth variation to a particular golf club head in reducing golf ball speed dispersion.

Figure 9A:
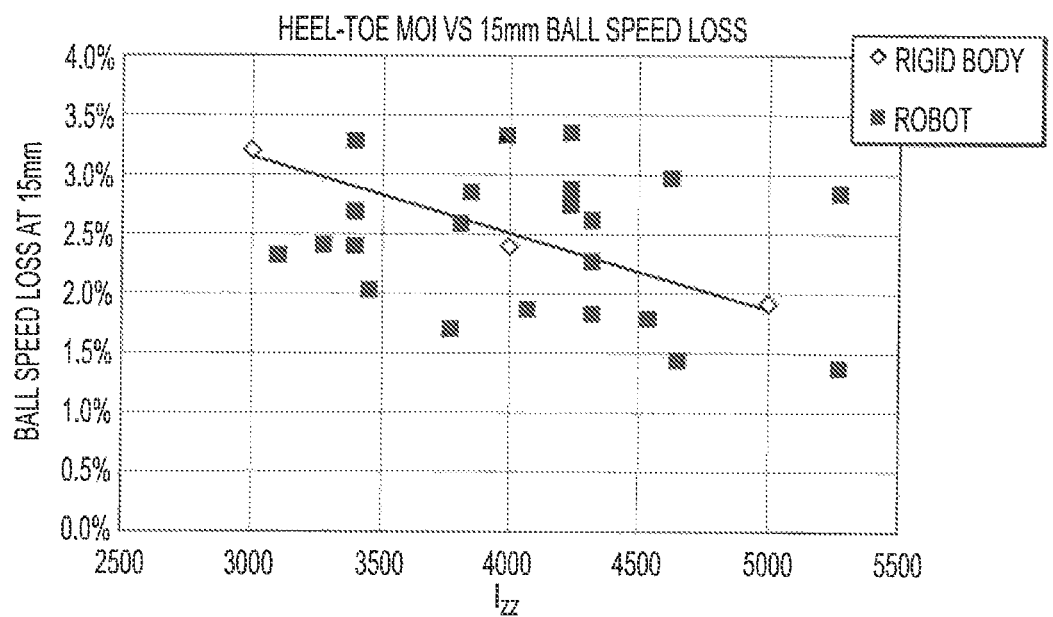
FIG. 9A is a plot showing a relationship between golf club head moment-of-inertia and ball speed loss for comparative golf club heads having striking faces without variable depth and pitch grooves.
Figure 9B:
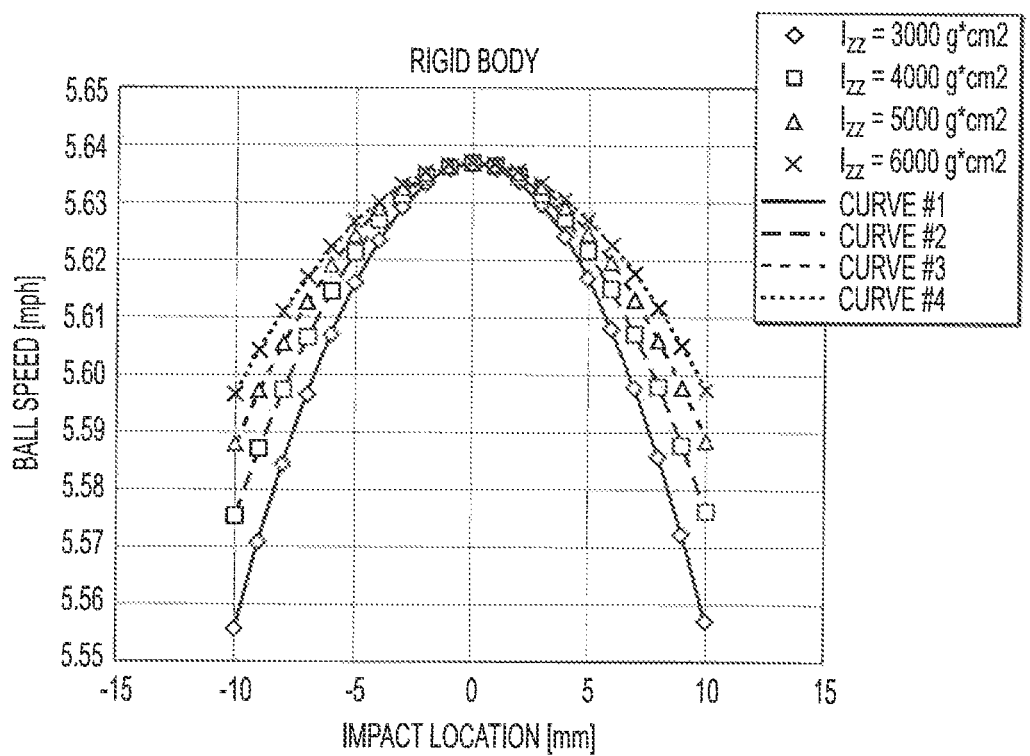
FIG. 9B is a plot correlating theoretical ball speed loss and impact location for comparative golf club heads having striking faces without variable depth and pitch grooves.

The inventors identified a golf club head's moment-of-inertia (MOI) as one of the physical properties affecting ball speed variation. For example, Izz (i.e., MOI about a vertical axis through a golf club head's center of gravity when the golf club head is in a reference position), in particular, is believed to be correlated with ball speed loss on off-center hits. FIG. 9A plots ball speed loss for putters having varying Izz values upon ball strikes at 15 mm laterally outward from the putters' face centers. Generally, higher MOI putters exhibit less ball speed loss. A similar trend may be observed in FIG. 9B, which plots ball speeds for theoretical putters having four different Izz values; these values are fit to quadratic curves. Using such theoretical models, pitch variation and depth variation of a plurality of grooves on a striking face of a golf club head may be designed to match expected ball speed loss based on the golf club head's MOI.

Table 4 demonstrates how ball speed variation may differ from club to club. The data listed include modeled data for six putter-type golf club heads, each having an associated MOI ($I_{zz}$) value and a mass. The MOI value and/or the mass of each golf club head is different from golf club head to golf club head. Table 4 lists impact positions (provided as lateral distances away from a face center) necessary to effect a 4, 3, 2, or 1% decrease in ball speed. For example, for "Cero Range," if a ball is struck at a point of the striking face that is 19.77 min away from the center line of the striking face, the ball speed is 4% less than if the ball was struck along the center line with the same momentum.

TABLE 4

| | Ball Speed Change | | | |
|---|---|---|---|---|
| | −4% | −3% | −2% | −1% |
| Theoretical Comparative Club A [mm] | +/−19.77 | +/−17.12 | +/−13.98 | +/−9.88 |
| Theoretical Comparative Club B [mm] | +/−20.71 | +/−17.94 | +/−14.65 | +/−10.36 |
| Theoretical Comparative Club C [mm] | +/−21.21 | +/−18.37 | +/−15.00 | +/−10.61 |

TABLE 4-continued

| | Ball Speed Change | | | |
|---|---|---|---|---|
| | −4% | −3% | −2% | −1% |
| Theoretical Comparative Club D [mm] | +/−20.95 | +/−18.15 | +/−14.82 | +/−10.48 |
| Theoretical Comparative Club E [mm] | +/−22.26 | +/−19.28 | +/−15.74 | +/−11.13 |
| Theoretical Comparative Club F [mm] | +/−22.81 | +/−19.76 | +/−16.13 | +/−11.41 |

Upon understanding the relationship between ball speed variation and certain key physical attributes, such as MO and/or mass, of the golf club head, the inventors were able to normalize the ball speed variation by varying groove depth and/or pitch. Table 5 provides model generated data for estimated ball speed change upon varying groove depth and pitch for a particular golf club head. As seen in Table 5, ball speed change may be expected to increase in magnitude with increasing groove depth and pitch.

TABLE 5

| Depth [in] | Pitch [mm] | Estimated Ball Speed Change |
|---|---|---|
| 0.0046 | 2.79 | 0.1% |
| 0.0058 | 2.69 | −0.4% |
| 0.0069 | 2.59 | −0.9% |
| 0.0081 | 2.48 | −1.3% |
| 0.0092 | 2.38 | −1.8% |
| 0.0104 | 2.28 | −2.2% |
| 0.0115 | 2.18 | −2.7% |
| 0.0127 | 2.07 | −3.1% |
| 0.0138 | 1.97 | −3.6% |
| 0.0150 | 1.87 | −4.0% |

Table 6 details attributes of inventive golf club heads, each having a plurality of grooves having varying depth and width. The exemplary golf club heads vary in weight and/or MOI. Depth values denote a perpendicular distance from a striking face plane to a groove bottom of a particular groove of the plurality of grooves. Pitch values denote groove to groove spacing. Depth values at increasing lateral distances away from the center line C are listed for each of the exemplary golf club heads. Similarly, pitch values at increasing lateral distances away from the center line C are listed for each of the exemplary golf club heads. While various golf club heads with different masses and MOIs are listed, additional golf club heads with other masses, MOIs, or physical parameters are within the scope of the present invention. As shown in Table 6, the plurality of grooves formed on striking faces of the example club heads have smaller depth for grooves farther away from the center line C toward either the heel portion H or toe portion T. In contrast, the groove pitch of the plurality of grooves for the exemplary club heads have larger pitch for grooves farther away from the center line C toward either the heel portion H or toe portion T.

TABLE 6

| | | Club | | | | | |
|---|---|---|---|---|---|---|---|
| | | Exem. Club #1 | Exem. Club #2 | Exem. Club #3 | Exem. Club #4 | Exem. Club #5 | Exem. Club #6 |
| | Head mass (g) | 369.05 | 369.1 | 368.7 | 403.9 | 404.5 | 343.2 |
| | MOI ($I_{zz}$) (g · cm$^2$) | 3153 | 4205 | 4437 | 4943 | 5239 | 4338 |
| Depth (mm) | @ FC | 0.3810 | 0.3810 | 0.3810 | 0.3810 | 0.3810 | 0.3810 |
| | @ 5 mm H and T | 0.3631 | 0.3647 | 0.3655 | 0.3669 | 0.3676 | 0.3651 |
| | @ 10 mm H and T | 0.3095 | 0.3159 | 0.3189 | 0.3246 | 0.3273 | 0.3174 |
| | @ 20 mm H and T | 0.1016 | 0.1205 | 0.1327 | 0.1555 | 0.1663 | 0.1265 |
| Pitch (mm) | @ FC | 1.8700 | 1.8700 | 1.8700 | 1.8700 | 1.8700 | 1.8700 |
| | @ 5 mm H and T | 1.9289 | 1.9236 | 1.9211 | 1.9164 | 1.9142 | 1.9224 |
| | @ 10 mm H and T | 2.1055 | 2.0844 | 2.0744 | 2.0556 | 2.0468 | 2.0795 |
| | @ 20 mm H and T | 2.7900 | 2.7278 | 2.6877 | 2.6124 | 2.5771 | 2.7081 |

Figure 10:
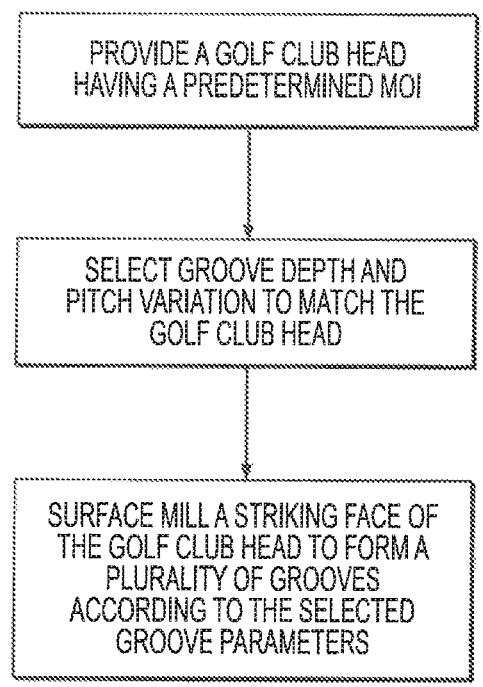
FIG. 10 shows a flowchart for a method of surface treating a golf club head.

FIG. 10 diagrams a method for forming a plurality of grooves on a golf club head where the plurality of grooves is optimally tuned to a particular key attribute of the golf club head, such as the exemplary clubs of Table 6.

According to one or more aspects of the disclosure, a golf club head having a striking face, a heel, a toe, and a MCI value is provided. The MOI value may correspond to MOI value about a particular axis through the center of gravity, e.g. about the vertical axis ($I_{zz}$). A depth profile may be selected based, at least in part, on the MOI value. Alternatively, or additionally, other attributes of the golf club head may be considered in selecting a depth profile. For example, golf club head mass may be factored in selecting a depth profile.

As shown in FIG. 10, surface milling may be used to form a plurality of grooves on the striking face of the golf club head.

In one or more aspects of the disclosure, the variable depth profile defines a variable groove depth approximately equal to the depth equation described above. Additionally, or alternatively, the pitch variation may be approximately determined by the pitch equation described above.

According to one or more aspects of the disclosure, a method of forming a plurality of grooves includes selecting a pitch variation based, at least in part, the MOI value (e.g. Izz) of the golf club head. Alternatively, or additionally, other attributes of the golf club head may be factored in selecting the pitch variation. For example, golf club head mass may be factored in selecting a pitch variation.

The step of selecting a variable depth profile may include determining whether the MOI value meets a first criteria, and if so, applying a first depth profile, or a second criteria, different from the first criteria, and, if so, applying a second depth profile that is different from the first depth profile.

The step of selecting a pitch variation may include determining whether the MOI value meets a first criteria, and if so, applying a first pitch variation, or a second criteria, different from the first criteria, and, if so, applying a second pitch variation that is different from the first depth profile.

According to one or more aspects of the disclosure, the depth profile is selected together with the pitch variation. Selecting the depth profile and the pitch variation includes determining whether the MOI value meets a first criteria, and if so, applying a first depth profile and a first pitch variation, or a second criteria, different from the first criteria, and, if so, applying a second depth profile and a second pitch variation that are different from the first depth profile and/or the first pitch variation. For example, if the MOI value of a golf club head is 3153 g·cm$^2$, a first criteria for MOI value may be met and a first depth profile and a first pitch variation corresponding to depth and pitch values provided in Table 6 for Exemplary Club #1 may be applied to the plurality of grooves formed on the striking face of the golf club head. In another example, if the MOI value of a golf club head is 4205 g·cm$^2$, a first criteria of MOI value may not be met, but a second criteria may be met. Accordingly, a second depth profile and a second pitch variation corresponding to depth profile and pitch variation provided in Table 6 for Exemplary Club #2 may be applied to the plurality of grooves formed on the striking face of the golf club head.

According to one or more aspects of the disclosure, the step of selecting the depth profile, the pitch variation, or both include determining whether the golf club head's mass meets a first criteria, and if so, applying a first groove variation (e.g., depth profile, pitch variation, or both), or a second criteria, different from the first criteria, and, if so, applying a second groove variation that is different from the first groove variation. For example, if the golf club head has a certain mass, it may meet a first criteria and the first groove variation may be applied. If the golf club head has a different mass, it may not meet the first criteria, but meet a second criteria; in such a case, a second groove variation may be applied.

The effectiveness of matching a particular golf club head having one or more key physical attribute (e.g., a predetermined MOI value or a mass) to a groove pitch and depth variation may be measured by measuring the distance a ball travels upon impact at various striking face locations, which may be referred herein as "ball roll out." To measure ball roll out variation of a particular golf club head, a ball may be struck with constant force at varying impact points on the golf club head's striking face.

FIGS. 11-18 plot ball roll out for balls struck at various lateral impact points for a golf club head, where a positive value of impact position denotes lateral distance away from a centerline towards the toe and a negative value of impact position denotes lateral distance away from a centerline towards the heel.

Figure 11B:
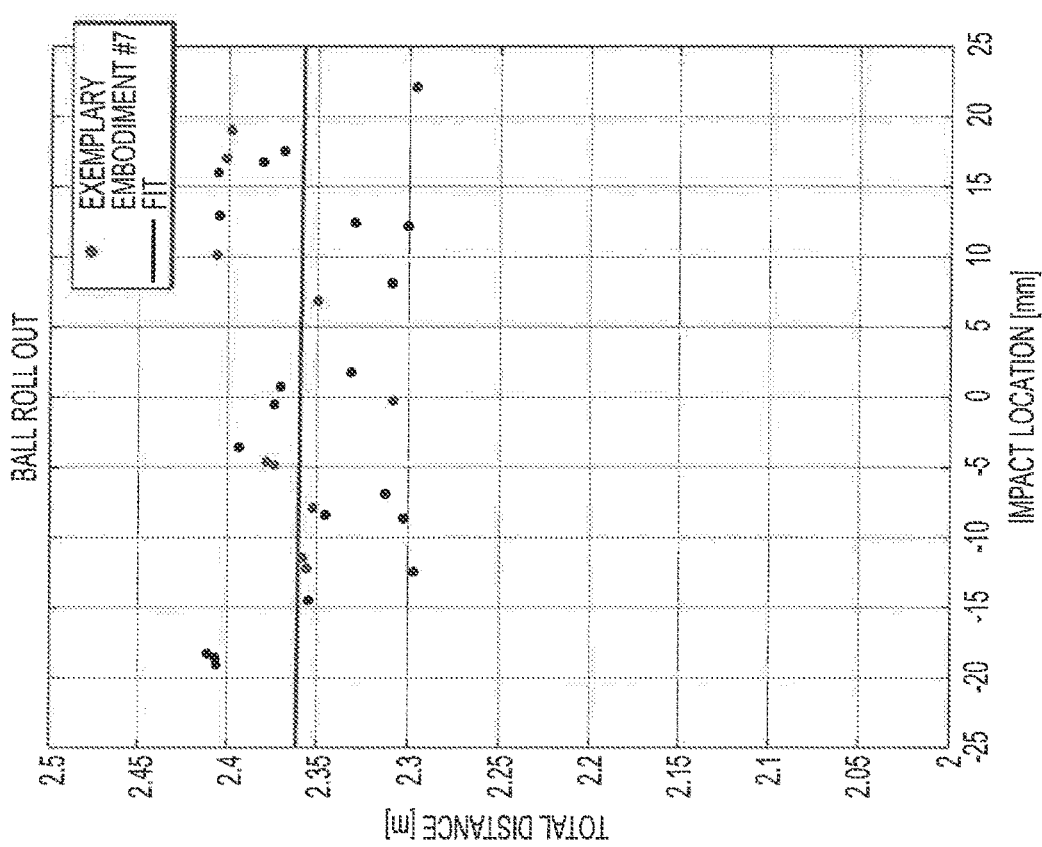
FIG. 11B is a plot correlating ball roll out distance with impact location for a seventh exemplary embodiment constituting a golf club with a striking face having grooves formed by variable milling.
Figure 11A:
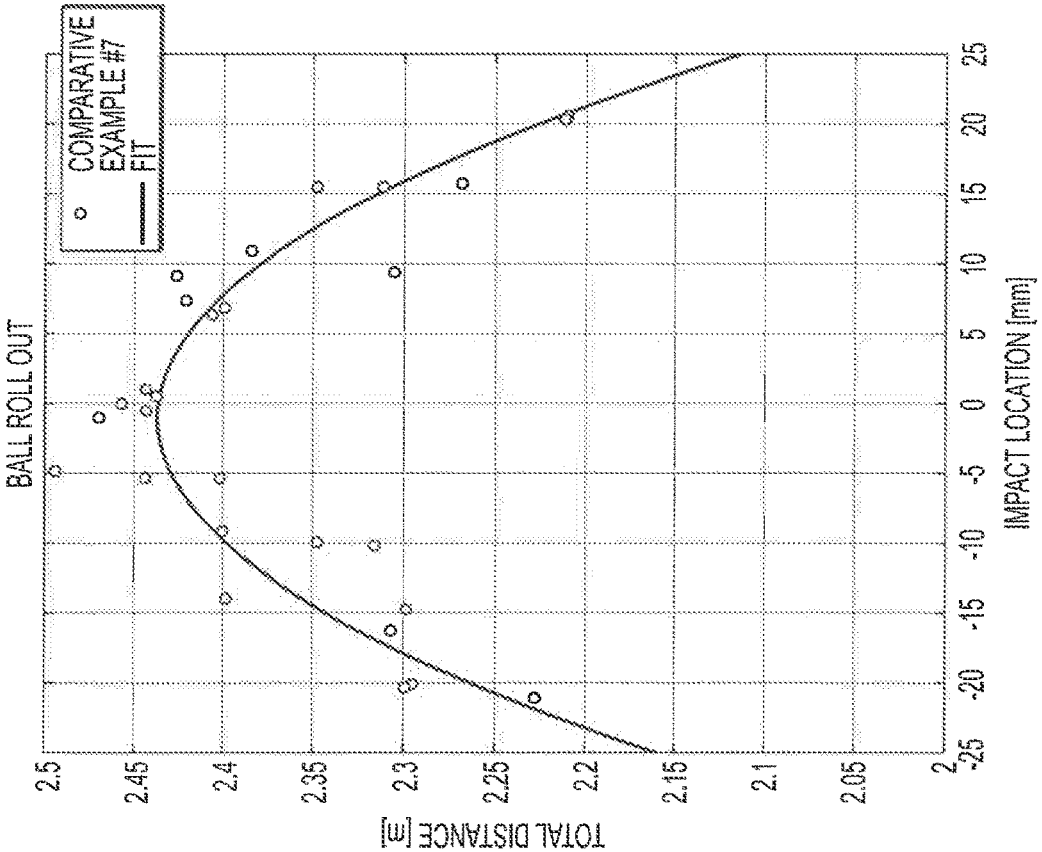
FIG. 11A is a plot correlating ball roll out distance with impact location for a seventh comparative golf club with a striking face having grooves formed by non-variable milling.
Figure 12B:
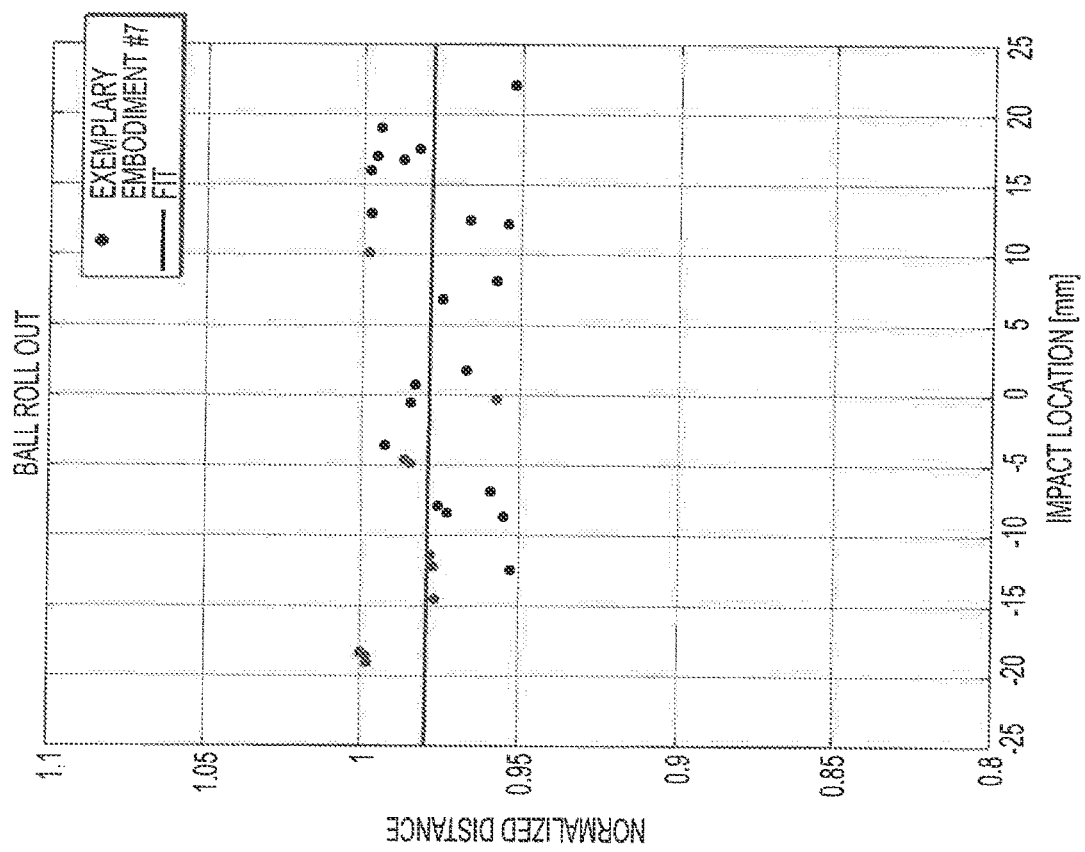
FIG. 12B is a plot correlating normalized ball roll out distance with impact location for the seventh exemplary embodiment.
Figure 12A:
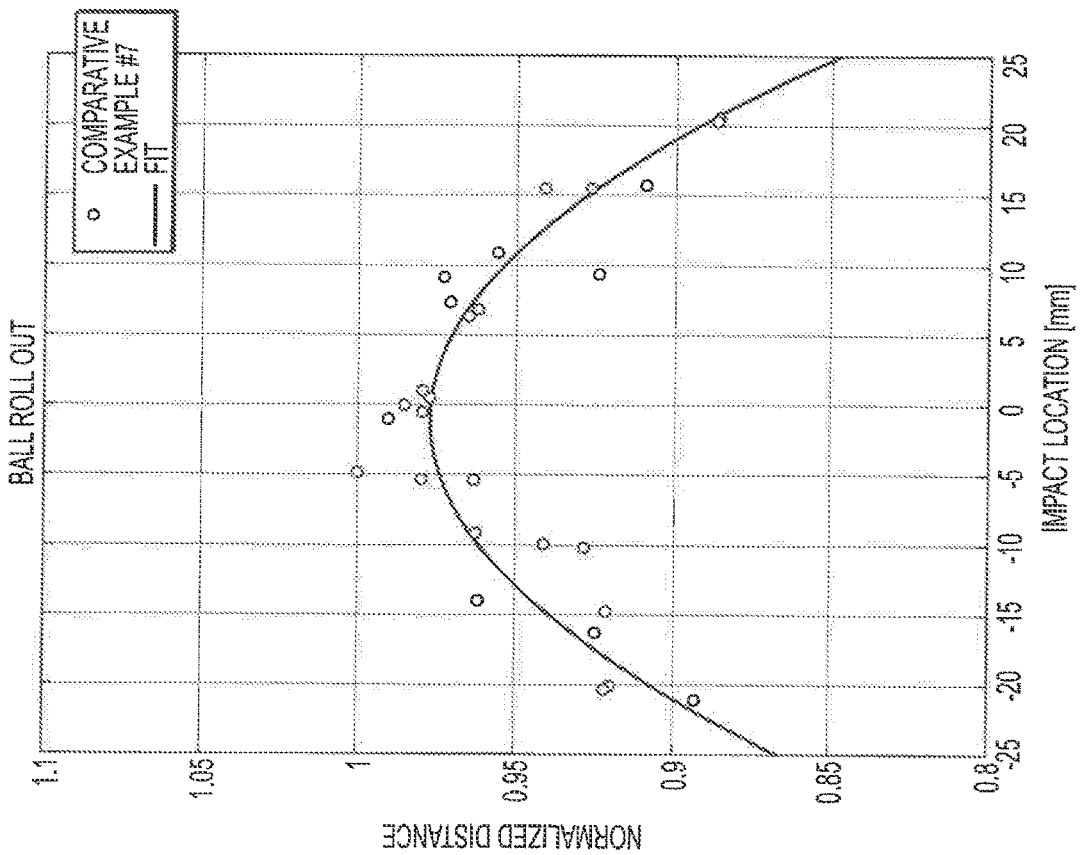
FIG. 12A is a plot correlating normalized ball roll out distance with impact location for the seventh comparative example.
Figure 13B:
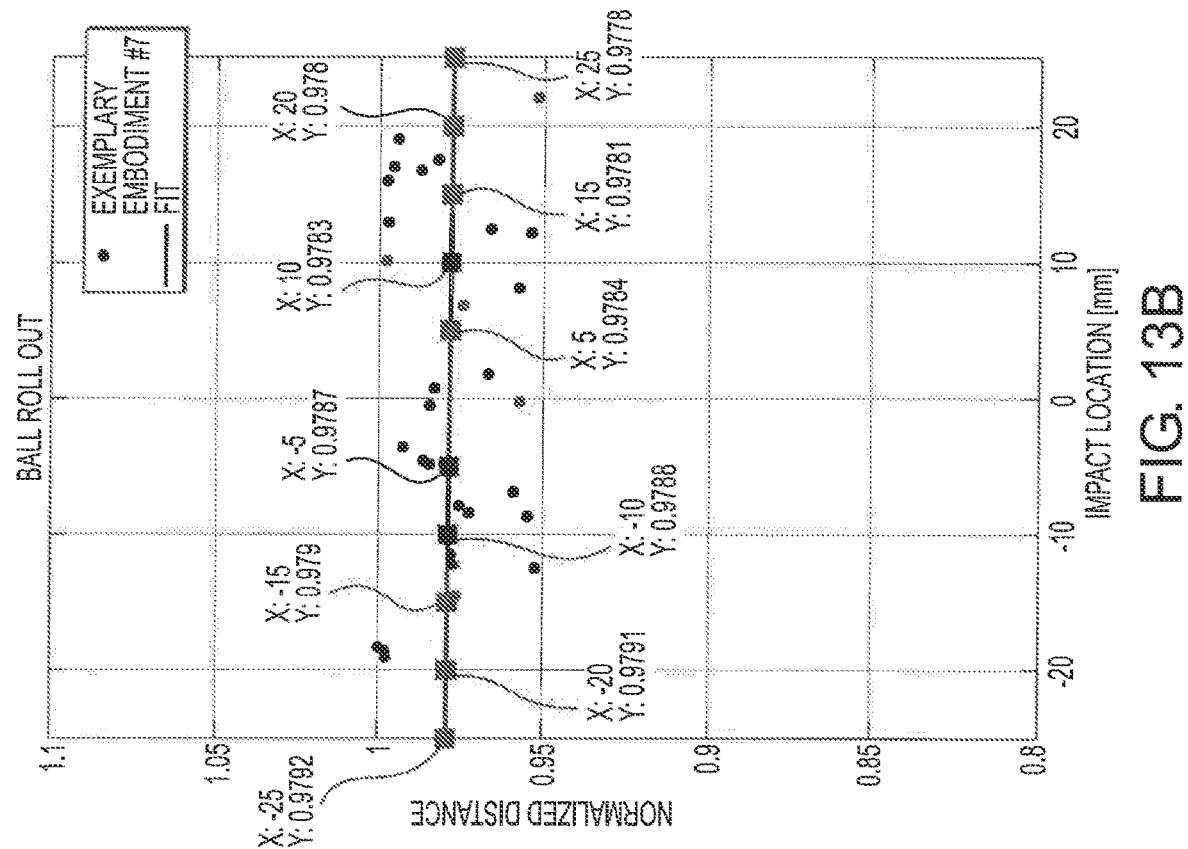
FIG. 13B is a plot correlating normalized ball roll out distance with impact location for the seventh exemplary embodiment and shows ball roll out distances along a regression curve.
Figure 13A:
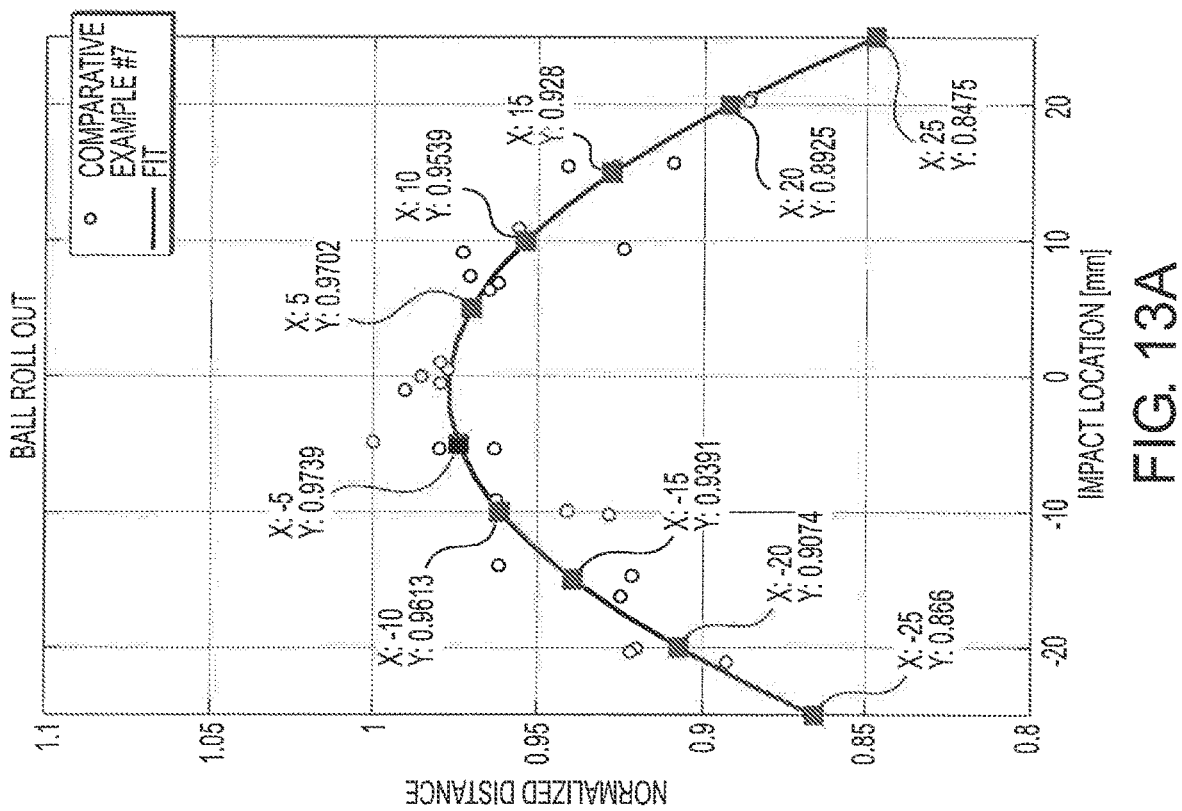
FIG. 13A is a plot correlating normalized ball roll out distance with impact location for the seventh comparative example and shows ball roll out distances along a regression curve.

FIGS. 11A and 11B respectively show ball roll out variation for identical golf club heads without and with variably milled grooves with statistical outliers removed. In FIG. 11A, the data points are fit to a quadratic curve; in FIG. 11B, the data is best represented by a straight line. The depth and pitch of the variably milled grooves were optimized according to key attributes of the golf club head such as MOI. FIGS. 12A and 12B show normalized ball roll out variation for the same data as FIGS. 11A and 11B. FIGS. 13A and 13B show the normalized ball roll out variations of FIGS. 12A and 12B along with a ball roll out distances at various points along the two regression lines.

Figure 15B:
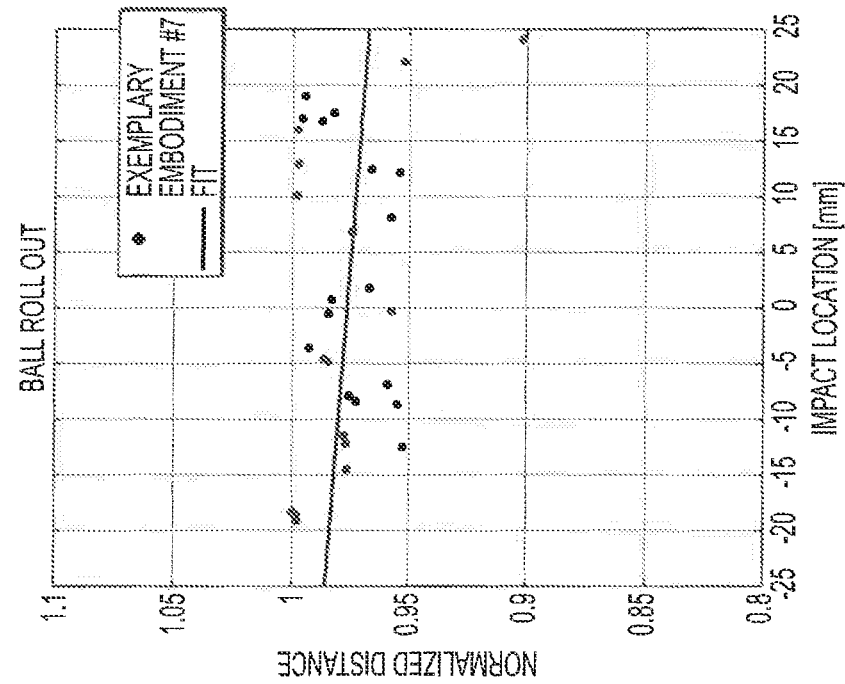
FIG. 15B is a plot including outlier points correlating normalized ball roll out distance with impact location for the seventh exemplary embodiment.
Figure 15A:
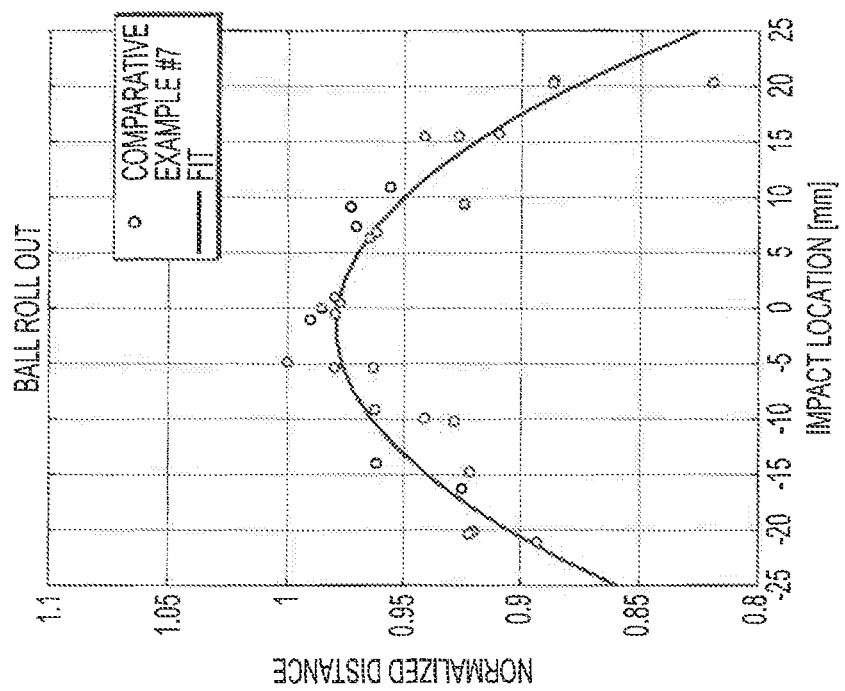
FIG. 15A is a plot including outlier points correlating normalized ball roll out distance with impact location for the seventh comparative golf club.
Figure 16B:
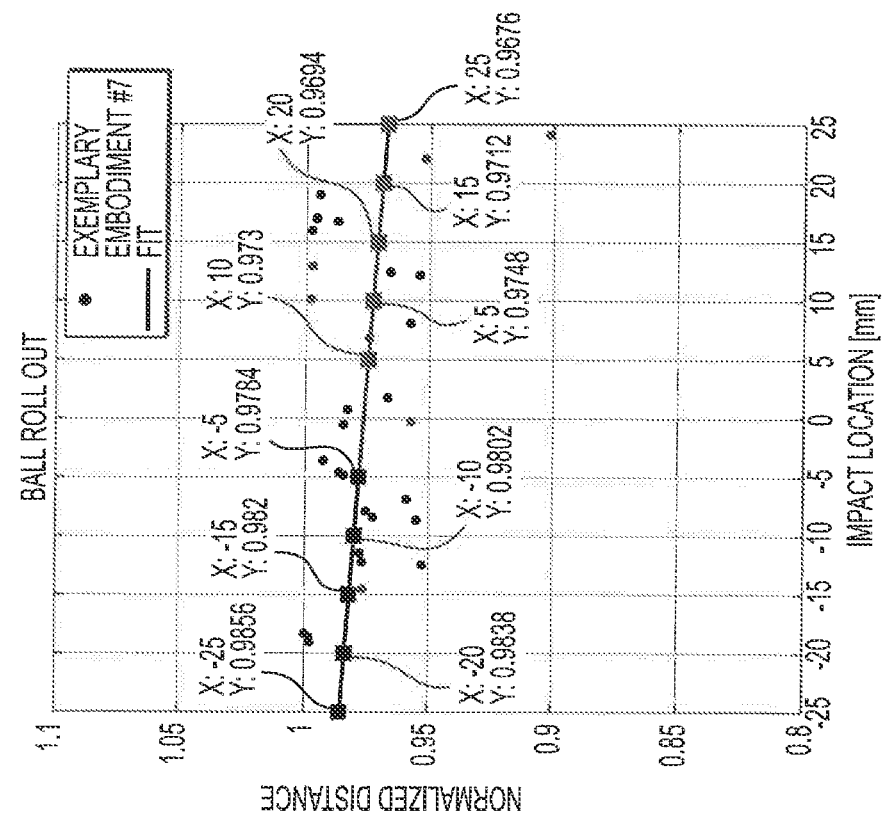
FIG. 16B is a plot including outlier points correlating normalized ball roll out distance with impact location for the seventh exemplary embodiment and shows ball roll out distances along a regression curve.
Figure 16A:
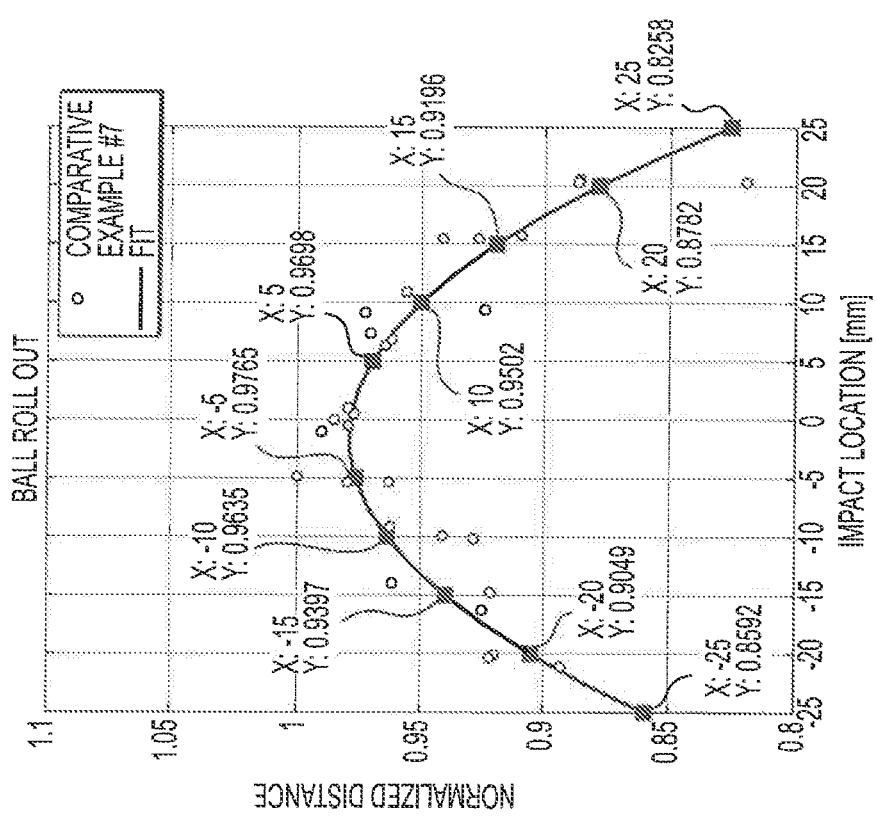
FIG. 16A is a plot including outlier points correlating normalized ball roll out distance with impact location for the seventh comparative golf club and shows ball roll out distances along a regression curve.

FIGS. 14A and 14B respectively show scatter plots depicting ball roll out variation for identical golf club heads without and with variably milled grooves as discussed above but including statistical outliers. In FIG. 14A, the data points are fit to a quadratic curve; in FIG. 14B, the data is best represented by a straight line. FIGS. 15A and 15B show normalized ball roll out variation for the data shown in FIGS. 14A and 14B, respectively. FIGS. 16A and 16B show the normalized ball roll out variations of FIGS. 15A and 15B, respectively, along with a comparison of ball roll out distance at various points along the two regression lines.

As seen in FIGS. 11-16, ball roll out varies approximately in a quadratic fashion for a striking face without variably milled grooves, which corresponds to the modeled data discussed previously. Also corresponding to the modeled data, ball roll out variation is significantly reduced when the golf club head has a striking face with variably milled grooves matched to the golf club head.

Figure 17B:
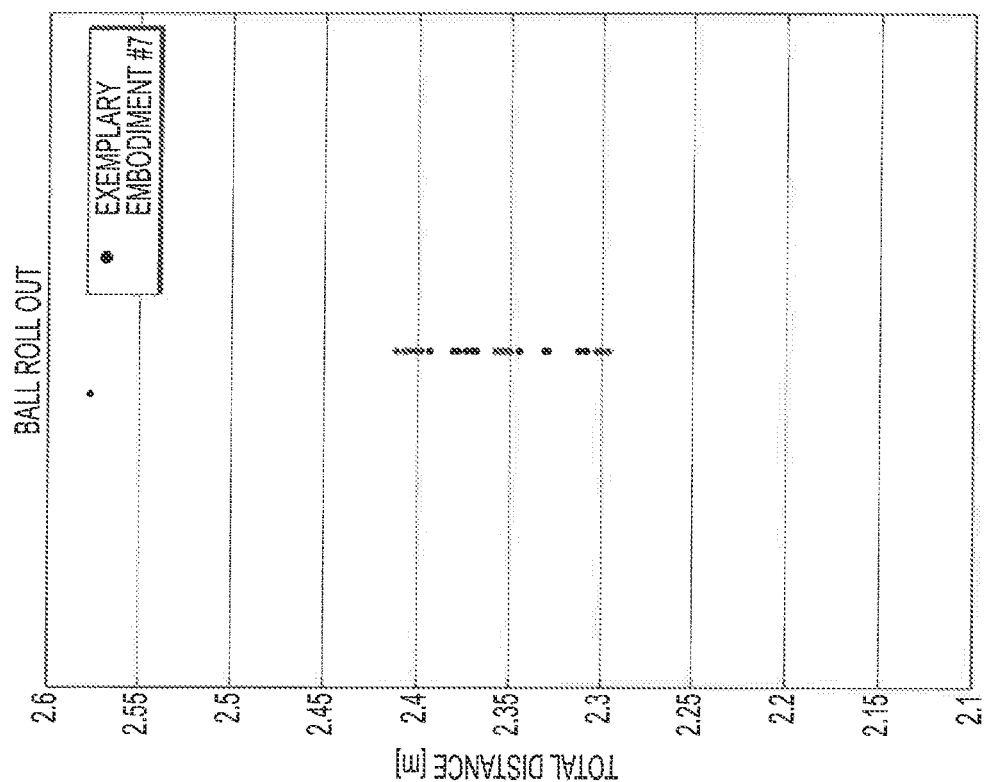
FIG. 17B shows ball roll out variation for the seventh exemplary embodiment.
Figure 17A:
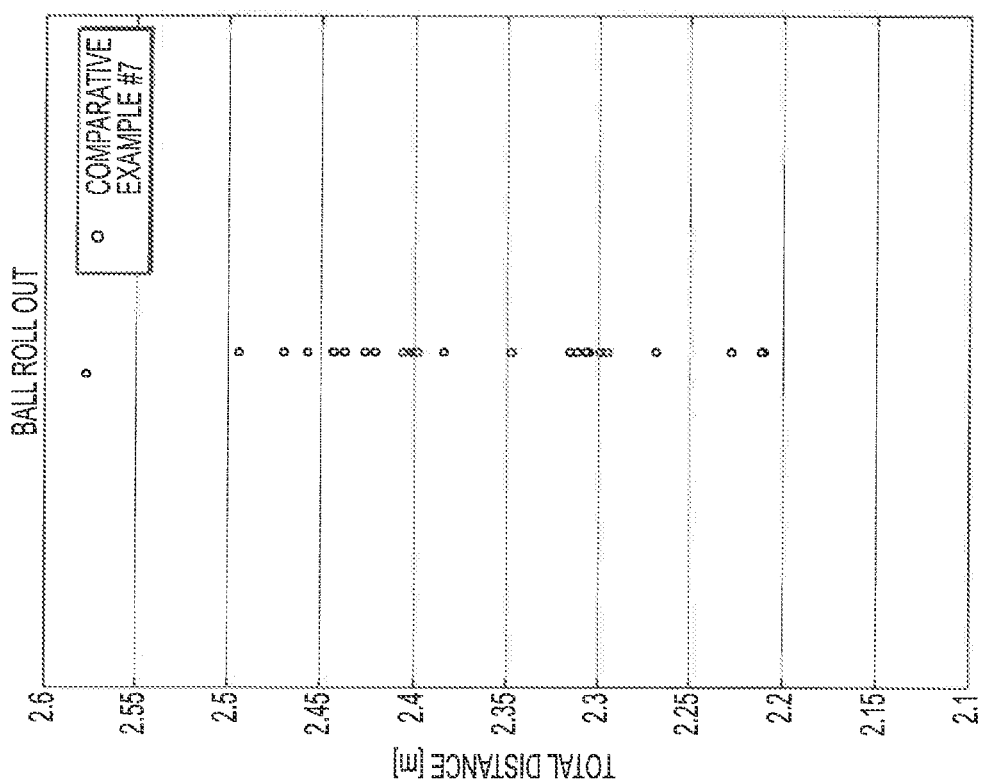
FIG. 17A shows ball roll out variation for the seventh comparative golf club head.
Figure 18B:
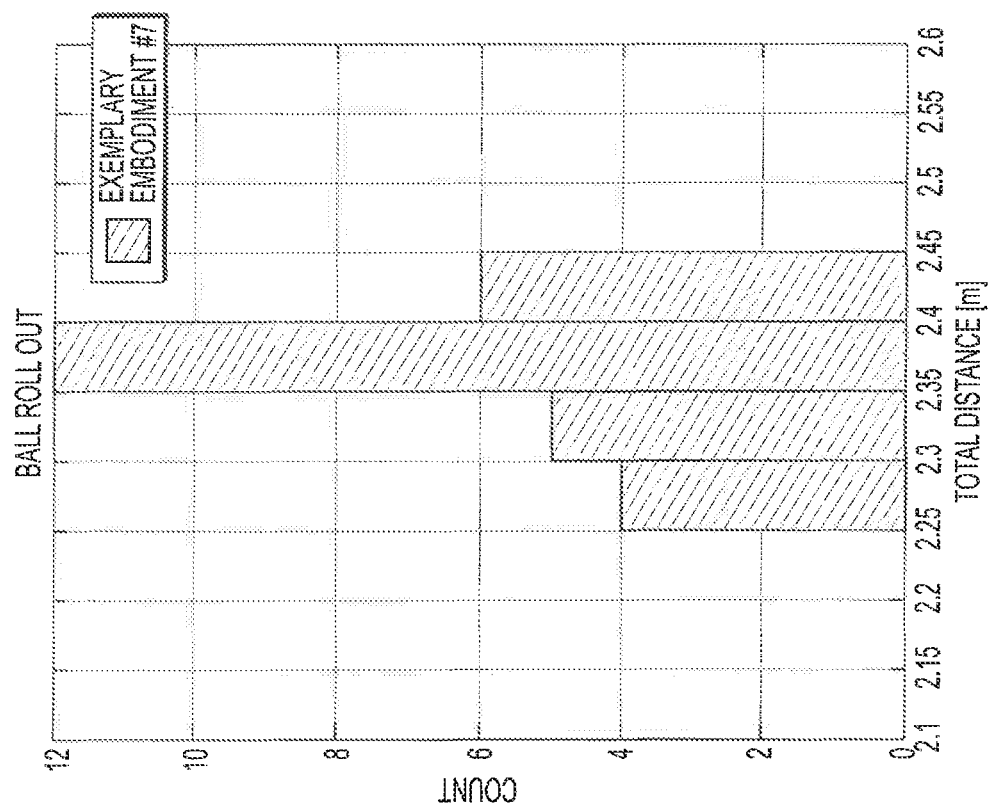
FIG. 18B is a histogram of ball roll out distances for the seventh exemplary embodiment.
Figure 18A:
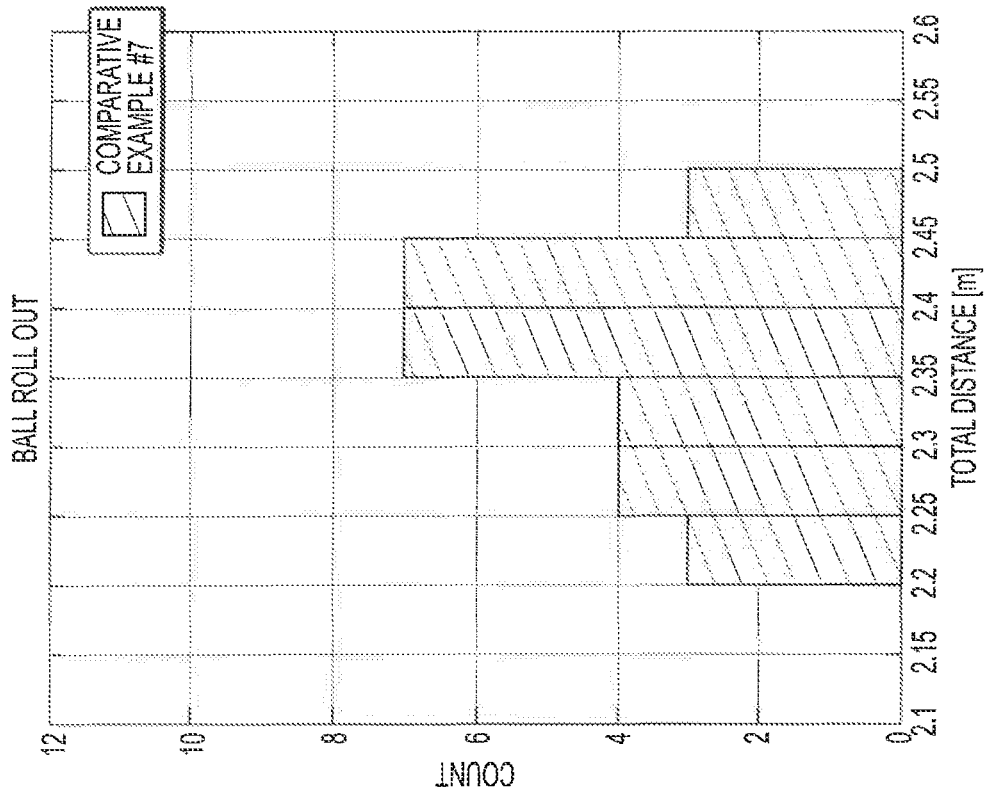
FIG. 18A is a histogram of ball roll out distances for the seventh comparative golf club head.
Figure 18C:
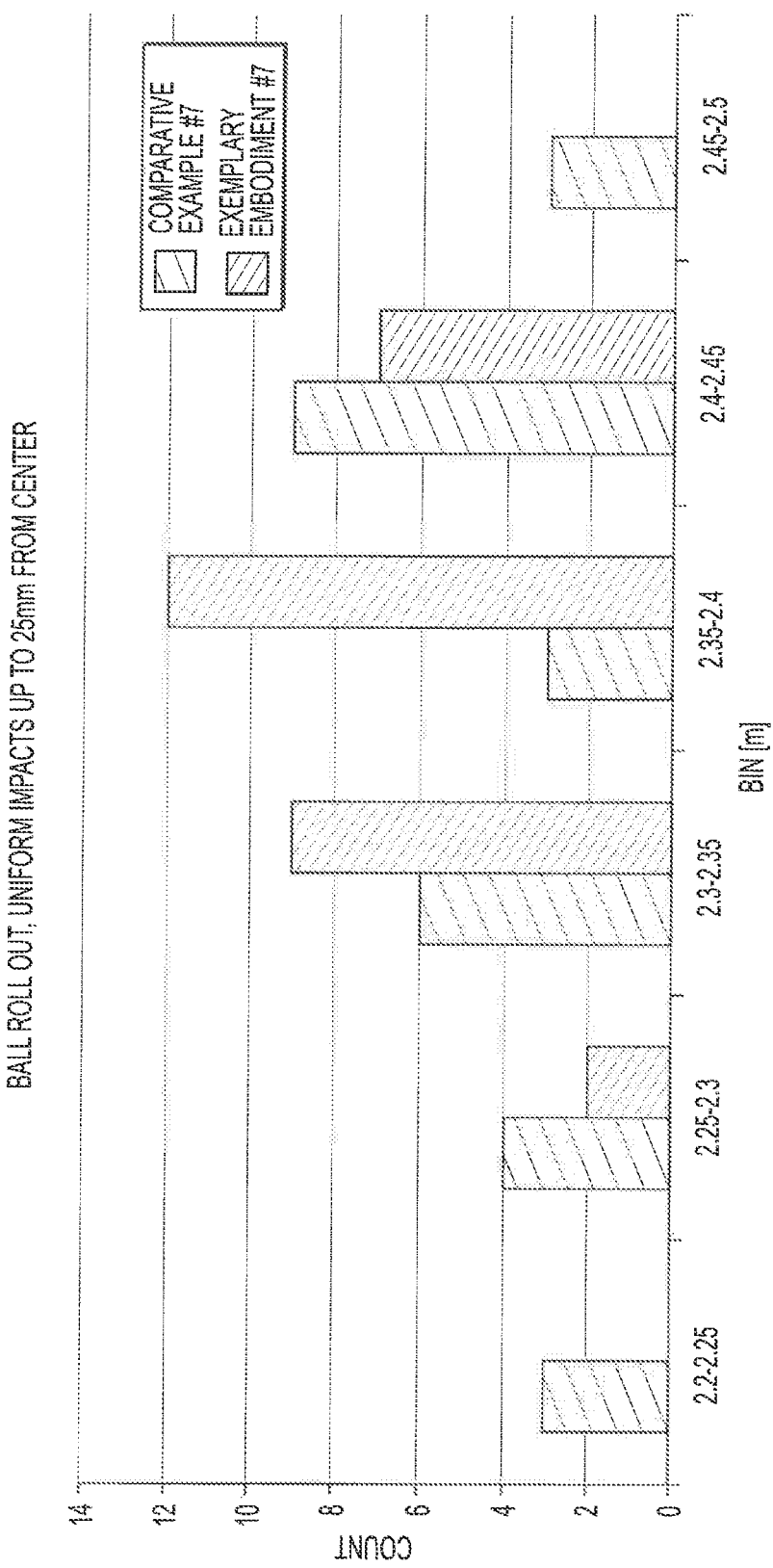
FIG. 18C is an overlay of the two histograms of FIGS. 18A and 18B.

This reduction in shot distance dispersion is visualized in FIGS. 17A and 17B, which respectively plot ball roll out irrespective of impact position for a striking face without and with variably milled grooves matched to the golf club head where the impact positions relative to the center line C are the same for FIGS. 17A and 17B. This contrast in ball roll out dispersions is also shown in the histograms of FIGS. 18A-18C. The reduction in shot dispersion as shown in these histograms results in greater performance for golfers who benefit from an increased wider striking region. I.e, unintentionally off-centered impacts are less likely to affect rollout distance, thus reducing the penalization associated with such mishits.

The effectiveness of variably milled grooves may also be quantified by the impact ball speed at various impact points. Herein, impact ball speed refers to the forward velocity of a golf ball when struck by a golf club head moving at a predetermined velocity. Optimally, impact ball speed would not vary regardless of horizontal impact location. Constant impact ball speed along the striking face results in low dispersion of shot distances. As shown in FIG. 8B, impact ball speed may be altered by varying groove parameters to match key attributes of a particular golf club head.

Figure 19A:
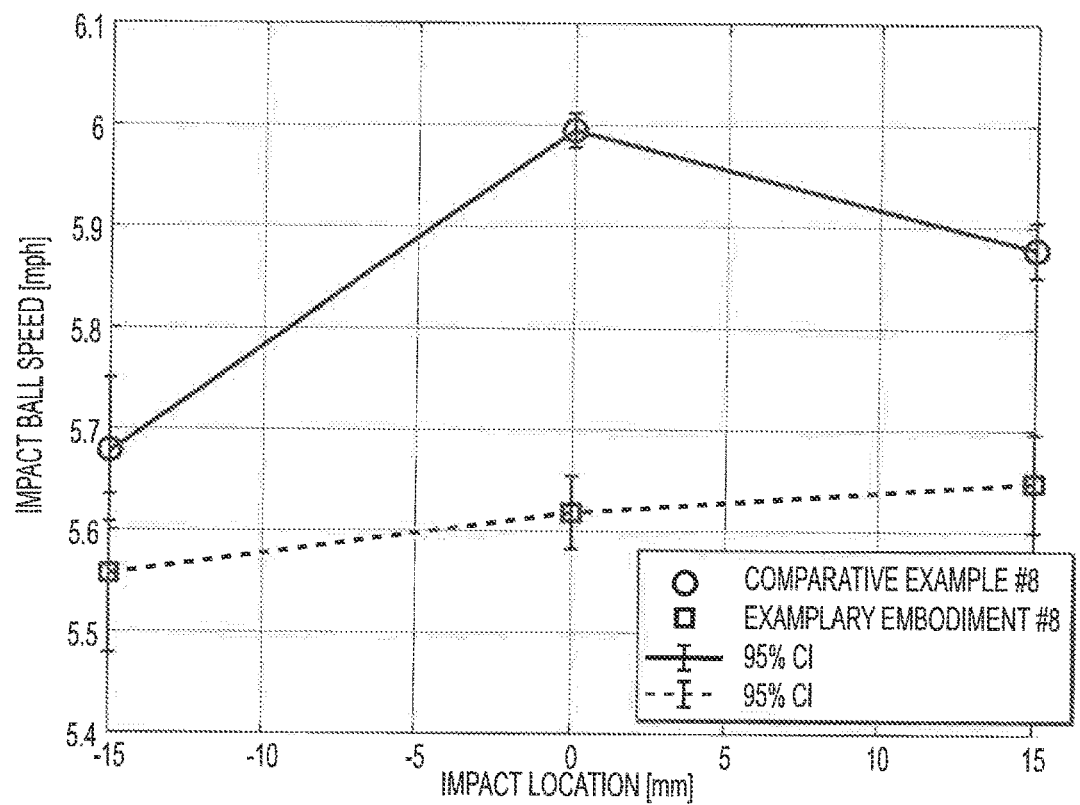
FIG. 19A is a plot of ball speeds of a golf ball upon impact with an eighth comparative golf club head and an eighth exemplary embodiment of the invention.

FIG. 19A compares impact ball speeds of two golf club heads: "Exemplary Embodiment #8" includes a striking face with variably milled grooves while "Comparative Example #8" includes a striking face with non-variable milled grooves. Ball impact speed for Comparative Example #8 is appreciably lower 15 mm away from the center line C (as compared to impacts at the center line C) while ball impact speed for Exemplary Embodiment #8 is more uniform across the striking face.

Figure 19B:
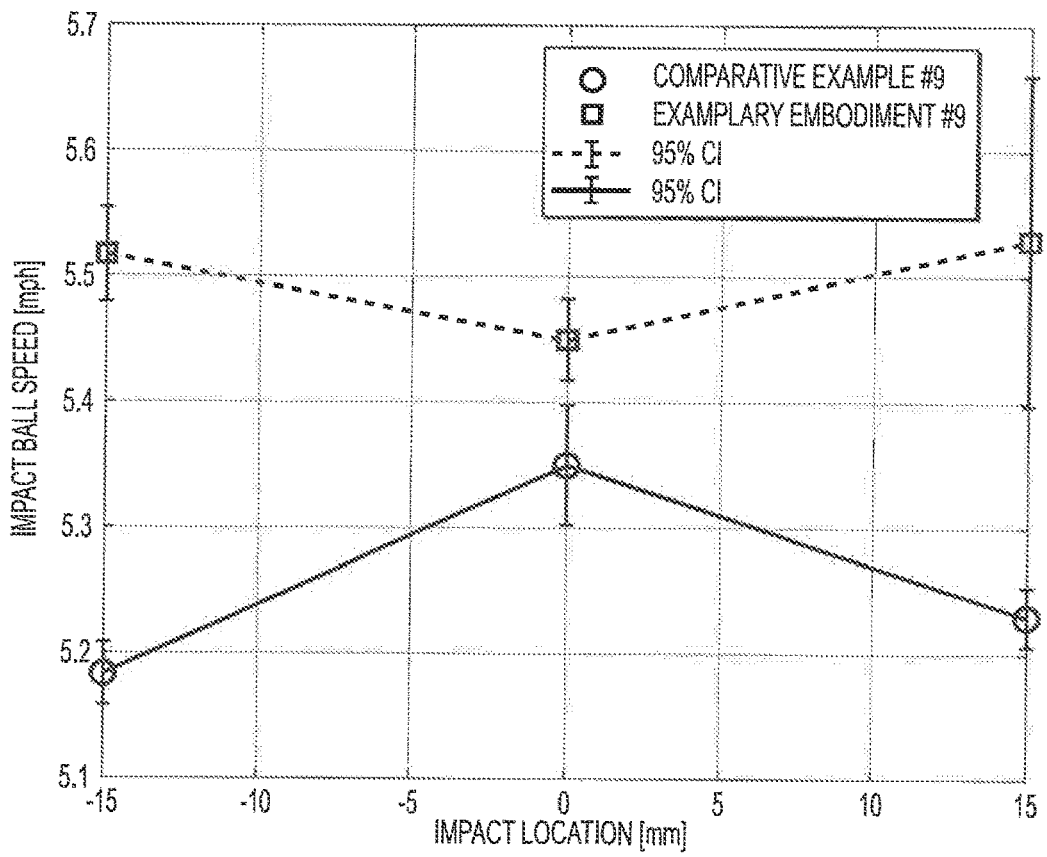
FIG. 19B is another plot of ball speeds of a golf ball upon impact with a ninth comparative golf club head and a ninth exemplary embodiment of the invention.

Similarly, FIG. 19B show impact ball speed varies substantially less for a golf club head having a striking face with variably milled grooves ("Exemplary Embodiment #9") than a golf club head having a striking face without variably milled grooves ("Comparative Example #9").

While various features have been described in conjunction with the examples outlined above, various alternatives, modifications, variations, and/or improvements of those features and/or examples may be possible. Accordingly, the examples, as set forth above, are intended to be only illustrative. Various changes may be made without departing from the broad spirit and scope of the underlying principles.

We claim:

1. A surface treatment method comprising:
    surface milling a striking face of a golf club head, using a cutter, thereby forming a plurality of grooves, the striking face comprising a face center,
    wherein:
    the plurality of grooves comprises a variable depth profile such that groove depth generally decreases from groove to groove in a laterally outward direction of the face center of the striking face; and
    the surface milling occurs at a rotational speed and a feed rate such that groove pitch generally increases in a laterally outward direction of the face center.

2. The method of claim 1, wherein the rotational speed is varied, at least in part, according to a predetermined moment-of-inertial of the golf club head.

3. The method of claim 1, wherein the feed rate is varied, at least in part, according to a predetermined moment-of-inertia of the golf club head.

4. The method of claim 1, wherein the depth profile is varied, at least in part, according to a predetermined moment-of-inertia of the golf club head.

5. The method of claim 1, wherein the plurality of grooves comprises:
    a first plurality of arcuate grooves; and
    a second plurality of arcuate grooves at least partially intersecting the first plurality of grooves.

6. The method of claim 1, wherein the groove depth is approximately equal to:

$$a_d x^2 + b_d x + c_d,$$

where $a_d$, $b_d$, and $c_d$ are each a predetermined number and x is a horizontal distance from the face center of the striking face.

7. The method of claim 1, wherein the pitch is approximately equal to:

$$a_p x^2 + b_p x + c_p,$$

where $a_p$, $b_p$, and $c_p$ are each a predetermined number and x is a horizontal distance from the face center of the striking face.

8. The method of claim 1, wherein each of the plurality of grooves has a substantially constant depth along the particular groove.

9. A golf club head that, when oriented in a reference position, comprises:
    a top portion,
    a bottom portion opposite the top portion;
    a heel portion;
    a toe portion opposite the heel portion; and
    a striking face comprising a face center and a plurality of grooves, each of the plurality of grooves having a substantially constant depth along the particular groove, the plurality of grooves having a variable depth from groove to groove as measured in a heel-to-toe direction,
    wherein the plurality of grooves has a pitch approximately equal to:

$$a_p x^2 + b_p x + c_p,$$

where $a_p$, $b_p$, and $c_p$ are each a predetermined number and x is a horizontal distance from an imaginary vertical line intersecting the face center.

10. The golf club head of claim 9, wherein the plurality of grooves includes a variable pitch as measured in the heel-to-toe direction.

11. The golf club head of claim 9, wherein the depth of each of the plurality of grooves has a maximum variance of about 10 μm or less.

12. The golf club head of claim 9, wherein the depth of each of the plurality of grooves has a maximum variance of about 5 μm or less.

13. The golf club head of claim 9, wherein the depth of the plurality of grooves is approximately equal to:

$$a_d x^2 + b_d x + c_d,$$

where $a_d$, $b_d$, and $c_d$ are each a predetermined number and x is a horizontal distance from an imaginary line intersecting the face center.

\* \* \* \* \*